(12) United States Patent
Czajkowski

(10) Patent No.: US 11,066,099 B2
(45) Date of Patent: Jul. 20, 2021

(54) METHODS AND APPARATUS FOR MOVING THE FRONT WHEELS OF A VEHICLE FORWARD

(71) Applicant: Marlin Crawler, Inc., Fresno, CA (US)

(72) Inventor: Michael Czajkowski, Fresno, CA (US)

(73) Assignee: Marlin Crawler, Inc., Fresno, CA (US)

( * ) Notice: Subject to any disclaimer, the term of this patent is extended or adjusted under 35 U.S.C. 154(b) by 124 days.

(21) Appl. No.: 16/259,943

(22) Filed: Jan. 28, 2019

(65) Prior Publication Data

US 2020/0010115 A1    Jan. 9, 2020

Related U.S. Application Data

(60) Provisional application No. 62/695,034, filed on Jul. 7, 2018.

(51) Int. Cl.
*B62D 7/18* (2006.01)
*B62D 7/20* (2006.01)
*F16C 11/06* (2006.01)

(52) U.S. Cl.
CPC ............ *B62D 7/18* (2013.01); *B62D 7/20* (2013.01); *B60G 2200/44* (2013.01); *B60G 2206/50* (2013.01); *F16C 11/0619* (2013.01); *F16C 2326/24* (2013.01)

(58) Field of Classification Search
CPC ........ B62D 7/18; B62D 7/20; B60G 2206/44; B60G 2206/50; B60G 2206/10; F16C 2326/05; F16C 2326/24
See application file for complete search history.

(56) References Cited

U.S. PATENT DOCUMENTS

| | | | |
|---|---|---|---|
| 6,398,240 B1 | 6/2002 | Taylor | |
| 7,185,901 B1* | 3/2007 | Stimely | A63B 55/61 |
| | | | 280/93.512 |
| 7,581,740 B1* | 9/2009 | Stimely | B60G 3/20 |
| | | | 280/124.136 |

(Continued)

OTHER PUBLICATIONS

Czajkowski, Michael, 'BigMike's Big Journey: A 2016 Tacoma Build Thread', Marlin Crawler Post #483 dated Sep. 7, 2017.

(Continued)

*Primary Examiner* — James A English
(74) *Attorney, Agent, or Firm* — Sierra IP Law, PC; Mark D. Miller

(57) ABSTRACT

The present invention provides embodiments of modified upper and lower control arms for attachment to the steering knuckle that came with the vehicle, or for attachment to a modified steering knuckle of an embodiment of the invention, such that the steering knuckle, and in particular the wheel hub opening of the steering knuckle, are located at positions that are closer to the front of the vehicle than the positions provided by the control arms that came with the vehicle. The forward position of the wheel hub relative to the position provided by the factory or stock control arms moves the wheel and tire forward by the same distance, thereby allowing much larger wheels and tires to be mounted on the vehicle which do not rub against or interfere with the wheel well, fender or body mount, thereby increasing the approach angle of the vehicle for use in off-road climbing.

29 Claims, 19 Drawing Sheets

(56) References Cited

U.S. PATENT DOCUMENTS

| | | | |
|---|---|---|---|
| 8,118,133 B2* | 2/2012 | Armfield | B60B 35/163 |
| | | | 180/371 |
| 2005/0242539 A1 | 11/2005 | Matthew | |
| 2014/0265202 A1* | 9/2014 | Bunker | B62D 7/18 |
| | | | 280/93.512 |
| 2015/0191065 A1* | 7/2015 | Vogler | B60G 3/06 |
| | | | 280/124.134 |
| 2016/0059652 A1* | 3/2016 | Weifenbach | B62D 17/00 |
| | | | 280/86.757 |

OTHER PUBLICATIONS

Photograph of steering knuckle, Dec. 2017.
Toyota parts catalog, steering knuckle (2005).

* cited by examiner

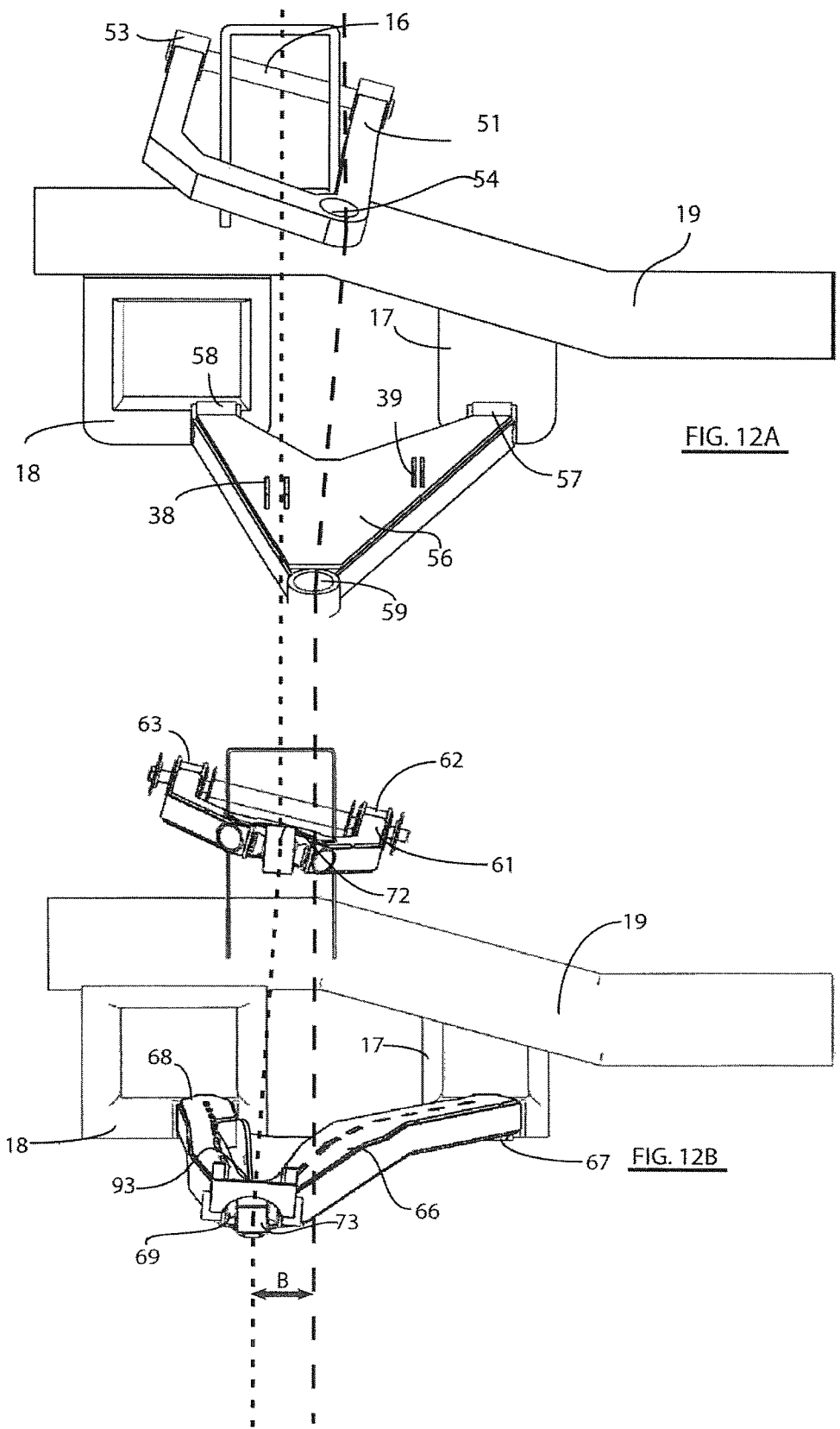

METHODS AND APPARATUS FOR MOVING THE FRONT WHEELS OF A VEHICLE FORWARD

This application is a non-provisional of and claims the benefit of U.S. Provisional Patent Application No. 62/695,034 filed on Jul. 7, 2018 which is incorporated herein by this reference in its entirety.

BACKGROUND OF THE INVENTION

1. Field of the Invention

The present invention relates to steering knuckles, and more particularly to after-market control arms and steering knuckles that are capable of moving a vehicle steering knuckle wheel hub opening forward to a location that is closer to the front of a vehicle to allow for the mounting of larger wheels and tires, and related methods.

2. Description of the Prior Art

A typical steering knuckle (or spindle) is a component of the front suspension of a vehicle, which attaches the wheel and brake assemblies to the vehicle, and allows the wheels to travel vertically, turn, and rotate. A steering knuckle is ordinarily pivotally attached to an upper control arm, and to a lower control arm of the vehicle steering assembly. These are pivotal attachments are typically made using ball joints. A wheel hub may be engaged with the wheel hub opening on the steering knuckle, and a vehicle wheel may, in turn, be attached to the hub. When a wheel is mounted on a steering knuckle installed in a vehicle, it is ordinarily partially enclosed within a wheel well and/or fender which prevents excess spray and debris from exiting as the vehicle tire is driven over different terrain. A wheel well may typically include a body mount at the rear thereof.

Many sport vehicles are used for rock crawling which is a form of off-road driving in which a vehicle is driven through harsh terrain and may encounter steep grades, boulders, rock piles and other obstacles. For rock crawling purposes, it is beneficial for the vehicle to have an approach angle that is as large as possible. An approach angle is the maximum angle of a ramp onto which a vehicle can climb from a horizontal plane without interference. It is defined as the angle between the ground and the line drawn between the front tire and the lowest-hanging part of the vehicle at the front overhang (typically the fender). The larger the approach angle, the steeper the grade that the vehicle can travel. Accordingly, for rock crawling purposes, a larger approach angle allows the vehicle to climb steeper grades or larger rocks.

A common way to increase the approach angle of a vehicle is to mount a larger tire on the wheel hub. This raises up the front of the vehicle, increasing the approach angle. However, the wheel well, fender and body mount of the vehicle will usually severely limit the size of tire that may be mounted on the vehicle. This is because, although a larger tire may be mounted on the wheel hub, the tire may rub against the wheel well, fender and/or body mount—especially when the tire is turned as the vehicle is turned. Any contact between the tire and the wheel well, the tire and the fender, and/or the tire and the body mount is unacceptable since it is unsafe and will destroy the tire. It is common to eliminate a lower front portion of the fender and wheel well of a vehicle to improve the approach angle, but a larger tire may still rub against the rear portion of the wheel well and/or the body mount. By way of example, even a slight increase in tire size, such as replacing a 31-inch tire with a 33-inch tire, without more, may result in the 33-inch wheel and tire rubbing against the wheel well and/or body mount, which is unacceptable.

It is therefore desirable to increase the approach angle of a vehicle by providing a way to mount larger tires on vehicles for off-road driving that do not rub against or interfere with the wheel well, fender and/or body mount.

SUMMARY OF THE INVENTION

Embodiments of the present invention provide modified upper and lower control arms for attachment to a vehicle steering knuckle which move the wheel hub opening of a steering knuckle forward relative to the position of the wheel hub opening on the steering knuckle when positioned by the factory or stock control arms provided with the original vehicle. This moves the location of a wheel mounted on the hub forward toward the front of the vehicle relative to the factory position. Embodiments of the invention may also include modified steering knuckles that work with modified upper and lower control arms to accomplish the same purposes. The modified control arms and optional modified steering knuckles allow larger wheels to be mounted on the vehicle which may increase the approach angle of the vehicle. In particular, in embodiments of the invention, the upper and lower factory or stock control arms provided with the vehicle are removed and replaced by upper and lower control arms of the present invention, which move the factory steering knuckle and wheel hub forward a desired distance toward the front of the vehicle. In other embodiments of the invention, the upper and lower factory control arms and the factory steering knuckle are removed and replaced with embodiments such that the replacement steering knuckle and wheel hub opening is moved forward a desired distance toward the front of the vehicle relative to the position of the factory steering knuckle. This results in moving the wheel hub, wheel and tire forward by that same distance. This forward positioning allows much larger tires to be mounted on the vehicle which do not rub against or interfere with the wheel well, fender or body mount.

In embodiments of the invention, the upper and lower control arms may be longer than the factory or stock control arms. Such longer arms achieve greater wheel-travel, suspension articulation, stability, clearance, and a reduction in overall component angles.

In reference to wheel-travel, both upper and lower control arms are longer, the wheel and tire, being connected at a point further away from each factory frame mount, will travel a greater vertical distance both up and down for the same amount of angle change between each control arm and the frame. This is a preferred characteristic in order to climb over or down from large obstacles.

In reference to suspension articulation, because the invention achieves a greater vertical range of motion in both up and down wheel-travel directions, the vehicle has an improved ability to maintain tire contact with the ground over terrain comprised of differing heights. This is a preferred characteristic to maintain traction and control.

In reference to stability, when both control arms are longer and the wheel and tire is moved farther away from each factory frame mount, the overall vehicle track width is increased thereby providing a wider stance which will maintain contact with the ground at a greater side-hill angle for increased stability in off-camber or roll-over situations. Additionally, because the knuckle is also moved farther away from each factory frame mount, a longer steering tie rod may be used which will undergo a smaller percent steering angle change during suspension cycling. These are both preferred characteristics to maintain control of the vehicle on steep angles as well as high speed drivability.

In reference to clearance, when the longer control arms position the wheel and tire farther away from the frame, more space is available behind the tire providing room for fitting additional or oversized coil spring, shock absorber, and anti-roll bar. It also allows for a larger tire to be fitted without interference at sharp steering angles with the frame and/or surrounding frame components.

In reference to reduced overall component angles, when both upper and lower control arms are longer and undergo a greater vertical distance for the same amount of angle change between each control arm and the frame (as described above), less suspension angle change is experienced for the same amount of wheel-travel when compared to that of the factory control arm design. Therefore, any amount of suspension angle change as a result from body roll, brake dive, acceleration, and articulation, is achieved with a smaller angle change at each control arm thereby prolonging the life of pivots, bushings, bearings, steering connections, drive axle joints and boots thereof, flexible brake lines, ABS and/or wheel speed sensor wiring harnesses, coil springs, and shock absorbers. Additionally, this reduction in control arm angle, specifically the lower control arm, results in improved ground clearance beneath the control arm.

In some embodiments, the vertical factory ball joints are replaced with horizontally oriented ball joints which include attachment points on both sides of the ball joint allowing for increased strength, reliability, and range of motion. Strength is increased by providing an additional attachment point between the steering knuckle and each control arm raising the number of attachment points per ball joint compared to the factory orientation count of one to two. This doubles the number of attachment points present per ball joint between control arm and knuckle requiring twice as much force and stress in order for the attachment of the ball joint to shear off. This "double shear" design is a substantial strength increase over the factory vertical ball joint mounting configuration and is desirable with rock crawling. Reliability is increased not only due to strength increase, but should the mounting hardware become lose, there are now two attachments per ball joint that must be detached in order for failure to occur. This is desirable for both normal city driving and recreational vehicle use such as rock crawling. Range of motion is also increased because the ball joint, being mounted horizontally in-line with the frame, pivots in the same plane as the frame mounts which are also mounted horizontally in-line with the frame. This is in contrast to the factory vertical ball joint orientation which is mounted perpendicular to the frame requiring ball joint misalignment with suspension cycling or articulation which puts an upper and lower limit on how much the knuckle can be misaligned with both upper and lower control arms. Horizontally mounted ball joints do not have such limitations and allow the suspension to cycle further up or down than vertical factory ball joints, which is a highly desirable trait with rock crawling and allows for a greater amount of travel than the factory suspension.

It is to be appreciated that by providing upper and lower steering knuckle control arms having ball joint mounts thereon that, when mounted to the vehicle frame, are a certain distance closer to the front of the vehicle than the ball joint mounts on the factory control arms provided with the vehicle, that the wheel hub opening on a steering knuckle attached to such control arms will also be closer to the front of the vehicle by approximately the same distance. Thus, for example and without limitation, providing upper and lower control arms having ball joint mounts thereon that are approximately one inch (1") closer to the front of the vehicle than those of the factory control arms, will also cause the wheel hub opening on a steering knuckle attached to such control arms to be approximately one inch (1") closer to the front of the vehicle. This is true even where there is a normal amount of caster (e.g. about 3°) between the ball joint mounts on the upper and lower control arms.

In different embodiments of the invention, the modified upper and lower control arms move the hub opening of the steering knuckle anywhere from approximately one-inch (1") to approximately four inches (4"), or more, forward toward the front of the vehicle, preferably between about one inch (1") and about two and one-half inches (2½") forward. As noted below, some optimal positions are about one inch (1") forward, about two inches (2") forward, and about two and one-half inches (2½") forward.

In embodiments of the invention, if the ball joint mounts of upper and lower control arms, and the wheel hub opening of the steering knuckle attached thereto, are approximately one inch (1") forward, this allows the 31-inch (31") tires provided with the vehicle to be replaced with tires as large as 35-inches (35") without rubbing against or interfering with the wheel well or fender, or requiring any modification to the body mount. In particular, replacing the factory control arms (and optionally the factory steering knuckle) with upper and lower control arms of the present invention having ball joint mounts that are forward by up to one inch (1") generally does not require replacement of any other factory parts on the vehicle. This allows for installation of thirty-five inch (35") tires with minimal difficulty. After such changes are made, should it be necessary or desirable, these parts (control arms and steering knuckle) may later be removed are replaced by the factory parts to restore the vehicle to its original condition.

In other embodiments of the invention, if the ball joint mounts of upper and lower control arms, and the wheel hub opening of the steering knuckle attached thereto, are approximately two inches (2") forward, this allows the 31-inch (31") tires provided with the vehicle to be replaced with tires as large as 37-inches (37") without rubbing against or interfering with the wheel well or fender, or requiring any modification to the body mount. However, replacing the factory control arms (and optionally the factory steering knuckle) with upper and lower control arms of the present invention having ball joint mounts that are forward by an amount greater than one inch (1"), but less than or equal to approximately two and one half inches (2½") (i.e., between 1" and 2½"), will require replacement of some additional parts, such as the steering control rod and axle. After such changes are made, should it be necessary or desirable, all of these parts (control arms, steering knuckle, steering control rod, axle, etc.) may later be removed are replaced by factory parts to restore the vehicle to its original condition.

Replacing the factory control arms (and optionally the factory steering knuckle) with upper and lower control arms of the present invention having ball joint mounts that are forward by up to and including two and one-half inches (2½") will generally not interfere with the steering turning radius of the vehicle. However, positions that are forward by more than two and one-half inches (2½") may result in a decreased steering turning radius. Thus, for example and without limitation, moving the positions forward by four inches (4") in order to accommodate forty-inch (40") tires will result in loss of steering turning capability unless significant additional modifications are made to the vehicle.

In embodiments of the invention, the upper control arm may have a body with a first pair of frame mounts at one end of the body, and a ball joint mount at an opposite end of the body for engagement with an upper ball joint that is mounted to a steering knuckle. The body of the upper control arm may be angled such that the ball joint mount thereon may be moved forward toward the front of the vehicle relative to the position of the corresponding upper ball joint mount on the factory upper control arm. The first pair of frame mounts engage with the same mounting structures on the vehicle frame or sub-frame as the factory upper control arm. Similarly, the ball joint mount attaches engages with the ball joint at the upper end of the steering knuckle. Accordingly, in these embodiments, it is possible to remove the upper factory control arm and replace it with an upper control arm of an embodiment of the present invention without having to change the vehicle frame mounts, the upper ball joint, or the steering knuckle of the vehicle.

Similarly, in embodiments of the invention, the lower control arm may also have a body and a second pair of frame mounts at one end of the body, and a ball joint mount at an opposite end of the body for engagement with a lower ball joint of a steering knuckle. The body of the lower control arm may also be angled such that the ball joint mount thereon may also be moved forward toward the front of the vehicle relative to the position of the corresponding ball joint mount on the factory lower control arm. The second pair of frame mounts engage with the same mounting structures on the vehicle frame as the factory lower control arm. Similarly, the ball joint mount engages with the lower ball joint at the lower end of the steering knuckle. Accordingly, in these embodiments, it is possible to remove the factory lower control arm and replace it with a lower control arm of an embodiment of the present invention without having to change the vehicle frame mounts, the lower ball joint, or the steering knuckle of the vehicle.

In other embodiments of the invention, the upper control arm may have a body with a first pair of frame mounts at one end, and an upper ball joint mount at the opposite end in the form of a uni-ball and bearing (sometimes referred to as a spherical bearing). The body of the upper control arm may be angled such that the uni-ball and bearing may be moved forward toward the front of the vehicle relative to the position of the corresponding ball joint mount on the factory upper control arm. The first pair of mounts engage with the same mounting structures on the vehicle frame as the factory upper control arm. In some embodiments, the uni-ball has an opening therethrough, and a bolt is passed through this opening; the combination of the uni-ball and bolt then replaces the stud of the upper ball joint. The bolt is attached to the steering knuckle where the ball joint stud was previously attached at the upper end of the steering knuckle. Accordingly, in these embodiments, it is possible to remove the factory upper control arm and replace it with an upper control arm of an embodiment of the present invention without having to change the vehicle frame mounts, or the steering knuckle of the vehicle.

Similarly, in other embodiments of the invention, the lower control arm may also have a body and a second pair of frame mounts at one end, and a lower ball joint mount at the opposite end in the form of a uni-ball and bearing (spherical bearing). The body of the lower control arm may be angled such that the uni-ball and bearing may be moved forward toward the front of the vehicle relative to the position of the corresponding mount on the factory lower control arm. The second pair of mounts engage with the same mounting structures on the vehicle frame as the factory lower control arm. In some embodiments, the uni-ball has an opening therethrough, and a bolt is passed through this opening; the combination of the uni-ball and bolt then replaces the stud of the lower ball joint mount. The bolt is attached to the steering knuckle where the ball joint stud was previously attached at the lower end of the steering knuckle. Accordingly, in these embodiments, it is possible to remove the lower factory control arm and replace it with a lower control arm of an embodiment of the present invention without having to change the vehicle frame mounts, or the steering knuckle of the vehicle.

It is to be appreciated that moving the hub opening of the steering knuckle forward is a primary objective of embodiments of the present invention. Since this opening is located toward the bottom of the steering knuckle, it is closer to the lower control arm. As a result, it is more important for the steering knuckle mount on the lower control arm to have a forward position (toward the front of the vehicle) relative to the lower factory control arm than the steering knuckle mount of the upper control arm. In some embodiments, the steering knuckle mounts of the upper control arms of embodiments of the present may not be moved forward at all, or they may be only slightly forward of the factory position; while the steering knuckle mounts of the lower control arms are significantly forward of the factory position.

In some embodiments, the forward distance toward the front of the vehicle of the steering knuckle mount on the lower control arm may be greater than the forward distance of steering knuckle mount on the upper control arm, resulting in an angle or caster between the upper and lower steering knuckle mounts. Such angles provide a slight rearward tilt on the axis of the steering knuckle to help the vehicle self-center when exiting corners, as well as providing stability at higher speeds. In further embodiments of the invention, a modified steering knuckle may be provided to replace the factory steering knuckle. Embodiments of modified steering knuckles of the present invention may have either (a) an upper horizontally oriented ball joint mount and a lower horizontally oriented ball joint mount, (b) an upper vertically oriented ball joint mount and a lower vertically oriented ball joint mount, (c) an upper horizontally oriented ball joint mount and a lower vertically oriented ball joint mount, or (d) an upper vertically oriented ball joint mount and a lower horizontally oriented ball joint mount. The position of the wheel hub opening in a modified steering knuckle of embodiments of the present invention may itself be forward of the position of the comparable factory steering knuckle.

For the embodiments that utilize a modified steering knuckle having an upper horizontally oriented ball joint mount, the factory steering knuckle is replaced with such an embodiment of a steering knuckle, and the factory upper control arm is replaced with an upper control arm having a corresponding horizontal upper ball joint mount for engagement with the horizontally oriented ball joint mount of the modified steering knuckle. For example and without limitation, an upper ball joint mount on an upper control arm of an embodiment of the invention may include a pair of flanges (ears) for receiving the ends of a bolt that extends through the horizontal ball of the ball joint, and the steering knuckle may include a socket or cup for receiving the ball itself. Alternatively, the flanges may be provided on the steering knuckle and the socket may be provided on the upper control arm.

In these embodiments, the modified upper control arm has a body with a first pair of frame mounts at one end of the body, and a horizontally oriented ball joint mount at an opposite end of the body which may have a double shear feature. The body of the upper control arm may be angled such that the horizontally oriented ball joint mount thereon may be moved forward relative to the position of the corresponding mount on the factory upper control arm. The first pair of frame mounts engage with the same mounting structures on the vehicle frame or sub-frame as the factory upper control arm. The horizontal ball joint mount engages with the horizontal ball joint mount at the upper end of the new steering knuckle. An embodiment of a lower control arm (described more fully elsewhere) will also be required to replace the factory lower control arm; the type of ball joint provided on the lower control will depend on whether the lower control arm mount on the new steering knuckle is horizontally or vertically oriented. Accordingly, in these embodiments, it is possible to remove the upper and lower factory control arms and the factory steering knuckle, and replace them with upper and lower control arms and a modified steering knuckle of an embodiment of the present invention without having to change the vehicle frame mounts of the vehicle.

It is to be appreciated that in embodiments having a modified steering knuckle with an upper horizontally oriented ball joint mount, the steering knuckle may be provided with either a horizontally or a vertically oriented lower ball joint mount.

For those embodiments that utilize a modified steering knuckle having a lower horizontally oriented ball joint mount, the factory steering knuckle is replaced with such an embodiment of a steering knuckle, and the factory lower control arm is replaced with a lower control arm having a corresponding horizontal lower ball joint mount for engagement with the lower horizontally oriented ball joint mount of the modified steering knuckle. For example and without limitation, a lower ball joint mount on a lower control arm of an embodiment of the invention may include a pair of flanges (ears) for receiving the ends of a bolt that extends through the horizontal ball of the ball joint, and the steering knuckle may include a socket or cup for receiving the ball itself. Alternatively, the flanges may be provided on the steering knuckle and the socket may be provided on the lower control arm.

In these embodiments, the modified lower control arm has a body with a second pair of frame mounts at one end of the body, and a horizontally oriented ball joint mount at an opposite end of the body which may have a double shear feature. The body of the lower control arm may be angled such that the horizontally oriented ball joint mount thereon may be moved forward relative to the position of the corresponding mount on the factory lower control arm. The second pair of frame mounts engage with the same mounting structures on the vehicle frame or sub-frame as the factory lower control arm. The horizontal ball joint mount engages with the horizontal ball joint mount at the lower end of the new steering knuckle. An embodiment of an upper control arm (described more fully elsewhere) will also be required to replace the factory upper control arm; the type of ball joint provided on the upper control arm selected will depend on whether the upper control arm mount on the new steering knuckle is horizontally or vertically oriented. Accordingly, in these embodiments, it is possible to remove the upper and lower factory control arms and the factory steering knuckle, and replace them with upper and lower control arms and a modified steering knuckle of an embodiment of the present invention without having to change the vehicle frame mounts of the vehicle.

It is to be appreciated that in embodiments having a modified steering knuckle with a lower horizontally oriented ball joint mount, the steering knuckle may be provided with either a horizontally or a vertically oriented upper ball joint mount.

It is to be appreciated that in embodiments where one of the ball joint mounts of the steering knuckle is horizontally oriented, the corresponding control arm must also have a ball joint mount that is also horizontally oriented. Similarly, in embodiments where one of the ball joint mounts of the steering knuckle is vertically oriented, the corresponding control arm must also have a ball joint mount that is also vertically oriented. Thus, a steering knuckle having upper and lower horizontally oriented ball joint mounts will require both upper and lower control arms with horizontally oriented ball joint mounts. A steering knuckle having upper and lower vertically oriented ball joint mounts will require both upper and lower control arms with vertically oriented ball joint mounts. A steering knuckle having a horizontally oriented upper ball joint mount and a vertically oriented lower ball joint mount will require an upper control arm with a horizontally oriented ball joint mount and a lower control arm with a vertically oriented ball joint mount. A steering knuckle having a vertically oriented upper ball joint mount and a horizontally oriented lower ball joint mount will require an upper control arm with a vertically oriented ball joint mount and a lower control arm with a horizontally oriented ball joint mount.

It is therefore an object of the present invention to provide methods and apparatus for moving the wheel hub opening of a vehicle steering knuckle forward relative to the factory position of the wheel hub opening in order to allow larger wheels and tires to be mounted thereon without changing or interfering with the wheel well, fender or body mounts.

It is also an object of the present invention to provide modified upper and lower control arms for a vehicle steering knuckle which move the location of the wheel hub opening of the factory steering knuckle forward relative to its original position when mounted using the modified control arms, so as to move the vehicle wheel forward relative to its original position.

It is also an object of the present invention to provide modified upper and lower control arms for a vehicle steering knuckle which move the factory steering knuckle forward relative to its original position when otherwise mounted using factory or stock control arms.

It is also an object of the present invention to provide modified upper and lower control arms and a modified vehicle steering knuckle for mounting the wheel hub opening of the steering knuckle in a position that is forward of the original position of the opening in the factory steering knuckle.

It is also an object of the present invention to provide modified upper and lower control arms for a vehicle steering knuckle which allow for larger wheels and tires to be mounted to the steering knuckle without touching or interfering with the wheel well, body mount or fender.

It is also an object of the present invention to provide modified upper and lower control arms and a modified vehicle steering knuckle which allow for larger wheel and tires to be mounted to the steering knuckle without touching or interfering with the wheel well, body mount or fender.

It is also an object of the present invention to increase the approach angle of a vehicle, thereby allowing the vehicle to climb on steeper terrain or rocks while driving.

It is also an object of the present invention to provide modified upper and lower control arms for a vehicle steering knuckle that move the wheel hub opening of the steering knuckle forward without requiring replacement of the steering knuckle itself.

Other objects of the invention will be apparent from the detailed descriptions and the claims herein.

BRIEF DESCRIPTION OF THE DRAWINGS

FIG. 12A is a side view of a set of upper and lower factory control arms showing them mounted to an exemplary vehicle frame, with a phantom line showing the position of the lower ball joint and wheel hub opening of the factory steering knuckle.

FIG. 12B is a side view of upper and lower control arms of an embodiment of the present invention showing them mounted to an exemplary vehicle frame, aligned with the view of FIG. 12A, with a second phantom line showing the forward position of the lower ball joint and wheel hub opening of the steering knuckle.

DETAILED DESCRIPTION OF THE DRAWINGS

Figure 1:
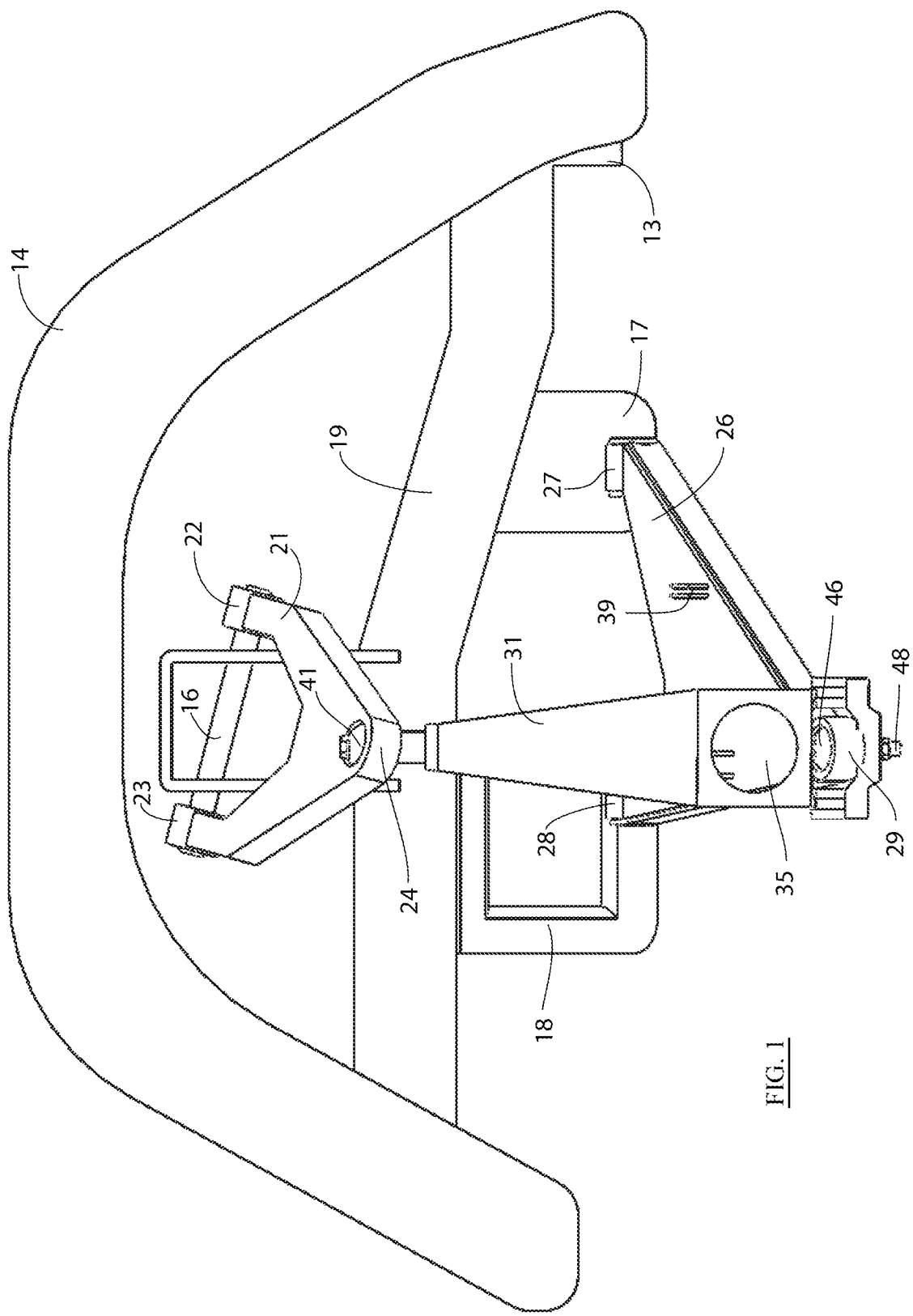
FIG. 1 is an environmental view showing upper and lower control arms of an embodiment of the present invention installed on a vehicle.
Figure 2:
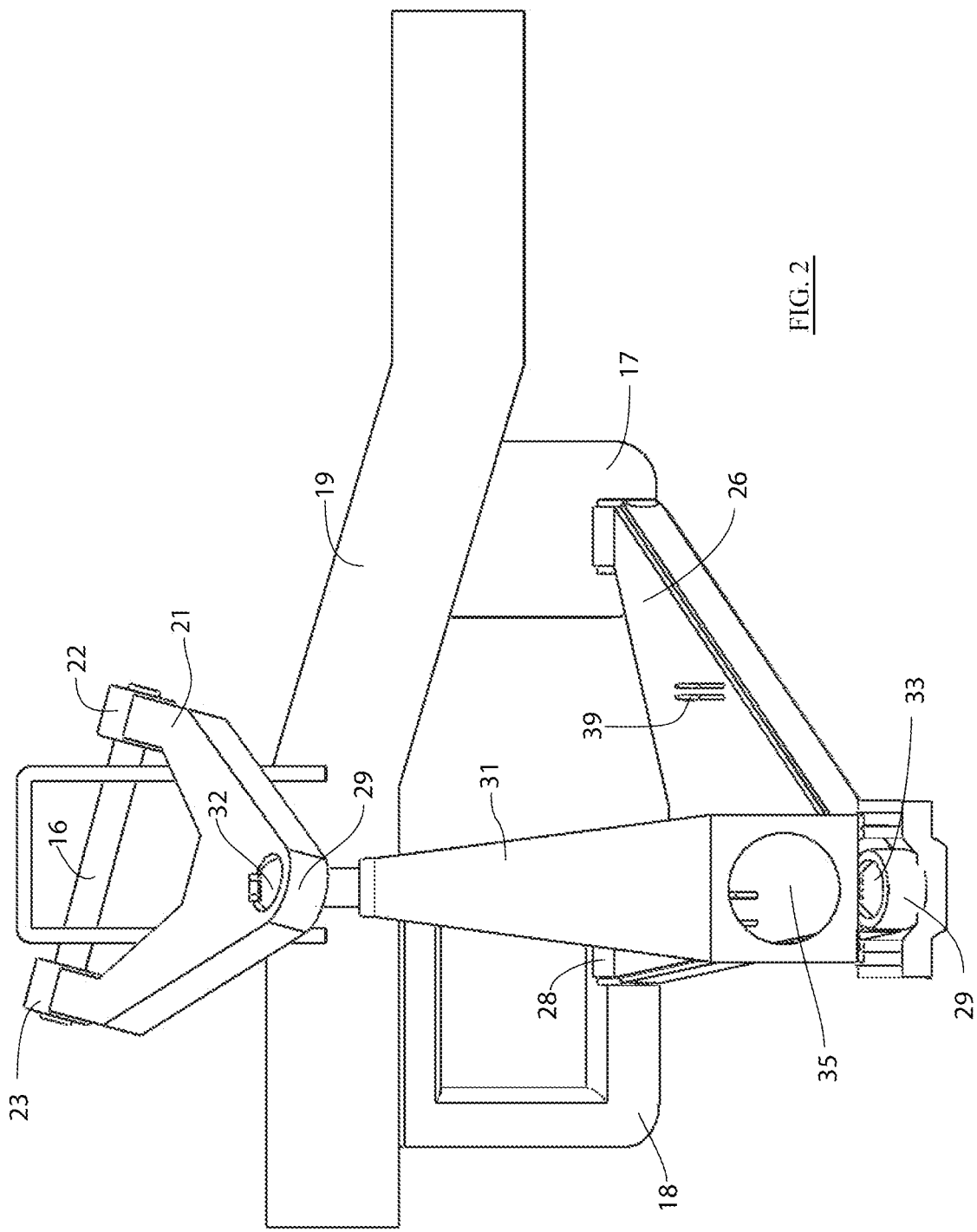
FIG. 2 is a side view of an embodiment of the control arms of the present invention showing them mounted to an exemplary vehicle frame and to an exemplary steering knuckle (spindle).
Figure 3A:
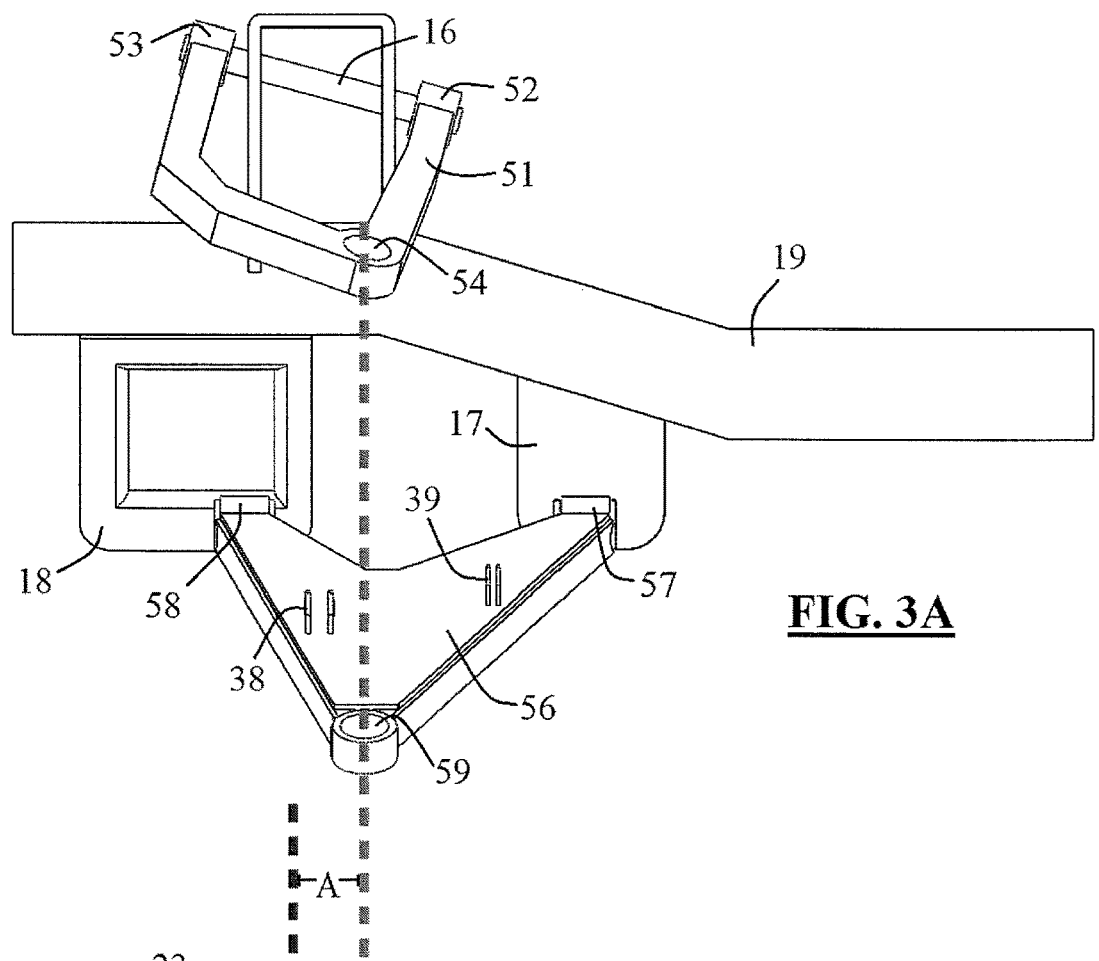
FIG. 3A is a side view of a set of upper and lower factory control arms showing them mounted to an exemplary vehicle frame, with a phantom line showing the position of the lower ball joint of the steering knuckle.
Figure 3B:
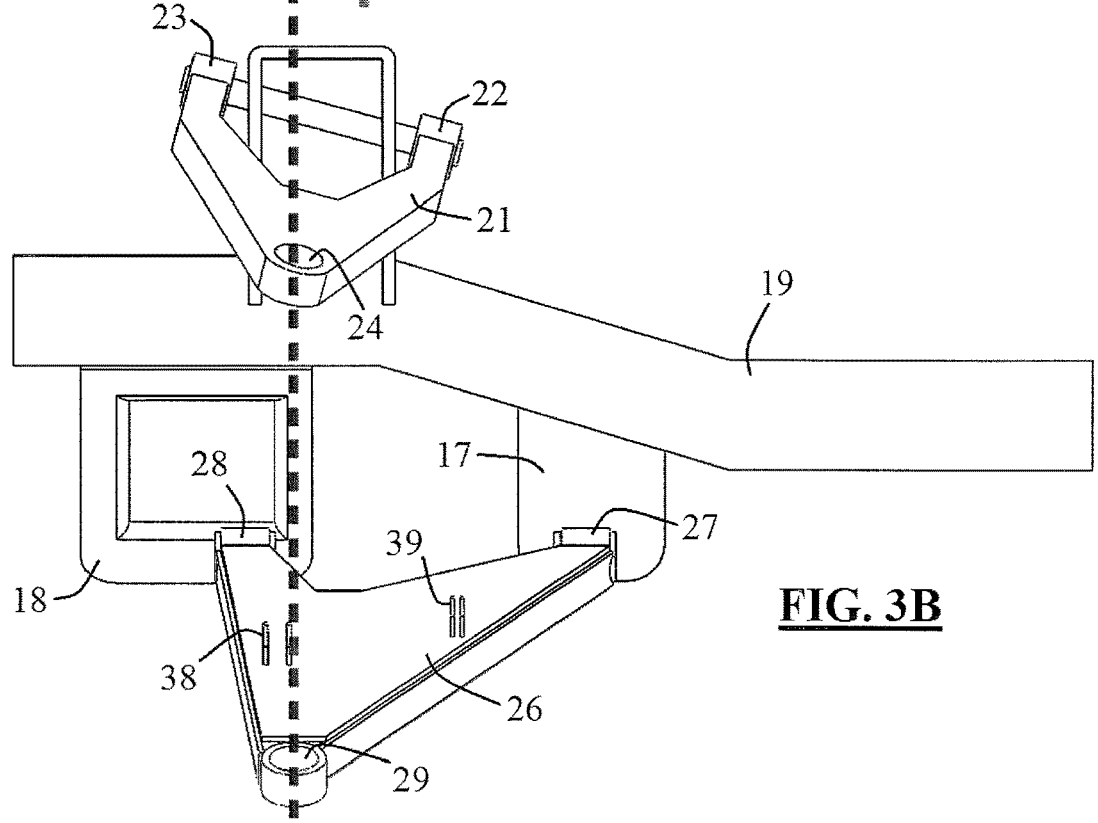
FIG. 3B is a side view of an embodiment of the upper and lower control arms of the present invention showing them mounted to an exemplary vehicle frame, aligned with the view of FIG. 3A, with a second phantom line showing the forward position of the lower ball joint of the steering knuckle.

Referring to the drawings wherein like reference characters designate like or corresponding parts throughout the several views, and referring particularly to FIGS. 1 through 5B, it is seen that this illustrated embodiment of the invention includes an upper control arm 21 having a pair of frame mounts 22 and 23 at one end, and a ball joint mount 24 at an opposite end. Mounts 22 and 23 are designed to attach to sub-frame assembly 16 of frame 19. It is to be appreciated that the location of the upper ball joint mount 24 may be forward of the position of the corresponding mount (e.g. upper ball joint mount) 54 of the factory upper control arm, as shown in FIGS. 4A and 4B (see gap "A"). Mount 24 may be a socket for receiving the ball portion 32 of a stud of the upper ball joint of the steering knuckle.

In the embodiments shown in FIGS. 6 through 9B, ball joint mount 24 includes a uni-ball 41 mounted inside a bearing 42 where the uni-ball has an opening therethrough 44. A bolt 43 is passed through the uni-ball opening 44 such that the combination of the uni-ball and bolt (41, 43) replaces the stud of the upper ball joint of the steering knuckle. It is to be appreciated that the location of the upper ball joint mount 24 may be forward of the position of the corresponding mount (e.g. upper ball joint mount) 54 of the factory upper control arm, as shown in FIGS. 8A and 8B (see gap "A"). In the embodiments shown in FIGS. 10-17 it is seen that upper mount 24 may be provided in the form of a horizontal ball joint mount, which is described more fully with reference to these figures below.

Figure 10:
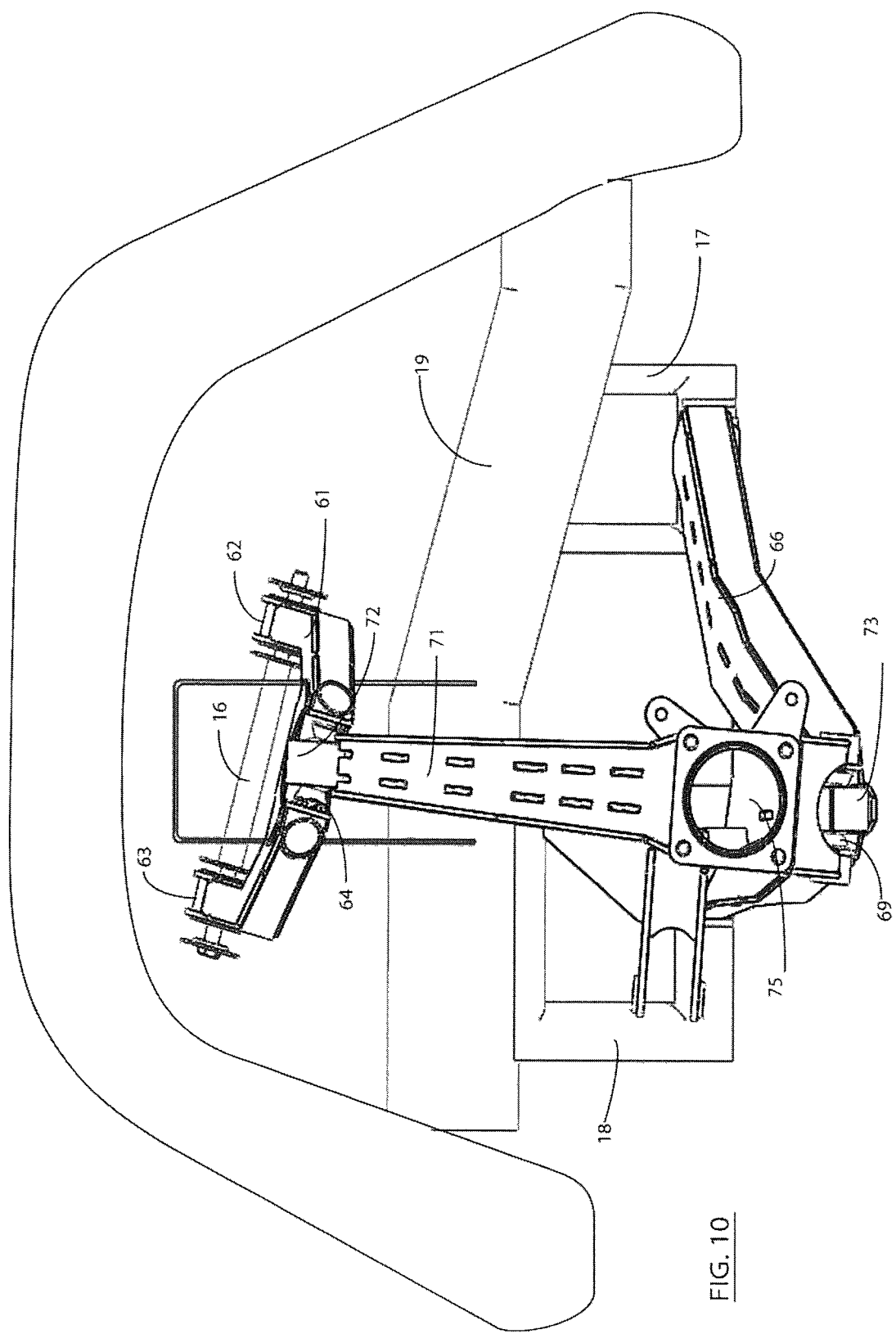
FIG. 10 is an environmental view showing upper and lower control arms and a steering knuckle of an embodiment of the present invention installed on a vehicle.
Figure 11:
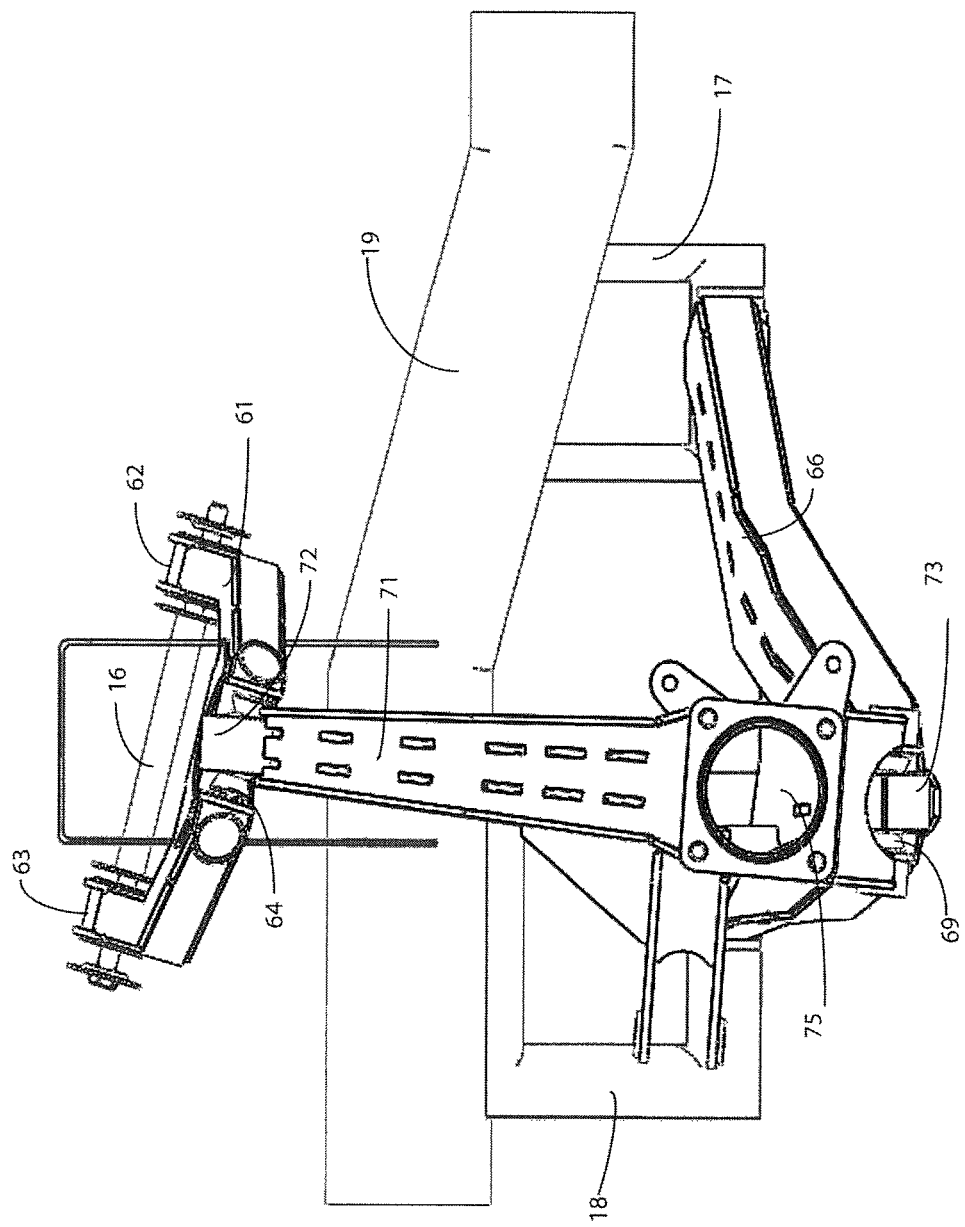
FIG. 11 is a side view of an embodiment of upper and lower control arms and a steering knuckle of the present invention showing them mounted to a vehicle frame.

As noted elsewhere herein, the forward position of the mount 24 may be zero (in which case the lower mount 29 has a forward location and the steering knuckle itself is angled toward the lower mount—see FIG. 10), as little as about one inch (1") and as much as about four inches (4") or more, but preferably between one and one-half inches (1.5") and three inches (3"), and optimally around two and one half inches (2.5") in order to accommodate the most desirable wheel sizes. The length of upper control arm 21 may also be greater than that of the factory control arm 51 by a range of about one-half inch (½") to about four inches (4").

Figure 4A:
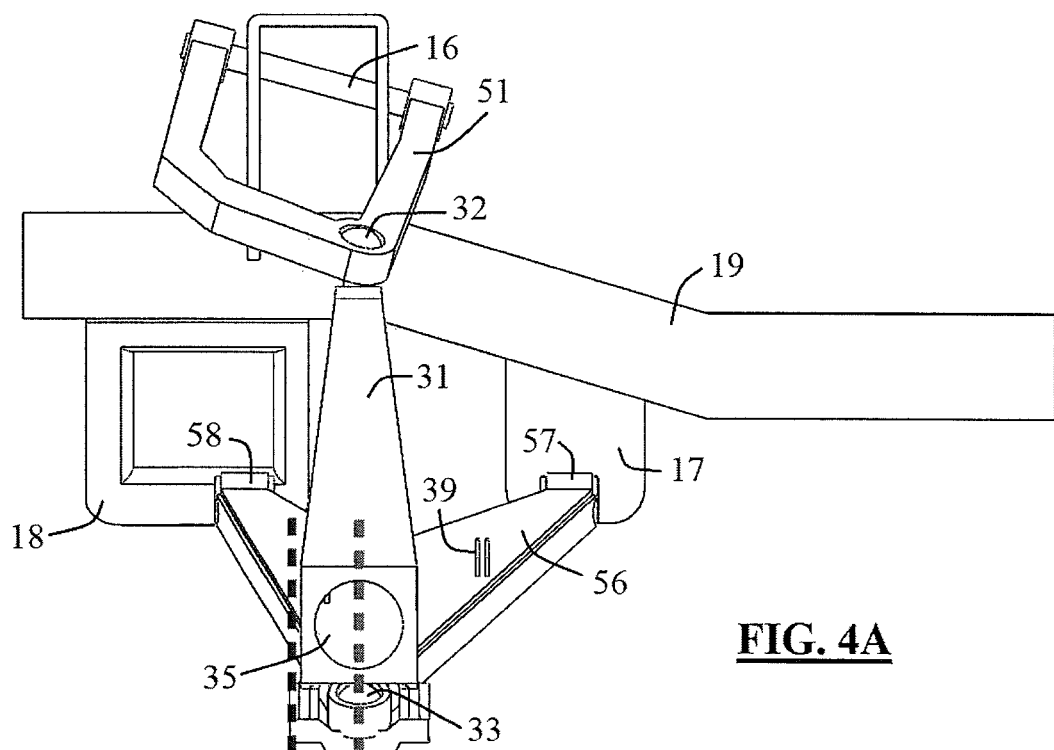
FIG. 4A is a side view of a set of upper and lower factory control arms showing them mounted to an exemplary vehicle frame and to an exemplary steering knuckle, with a phantom line showing the position of the lower ball joint and wheel hub opening of the steering knuckle.
Figure 4B:
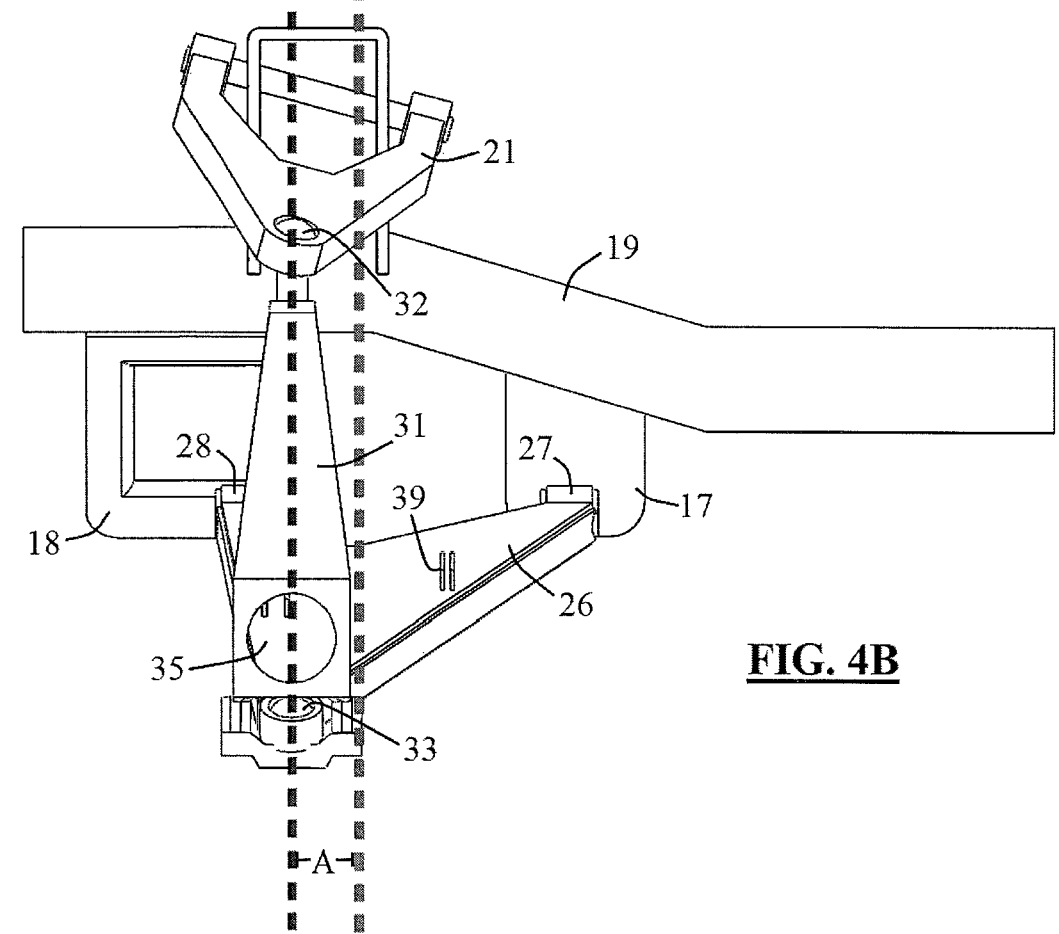
FIG. 4B is a side view of an embodiment of the upper and lower control arms of the present invention showing them mounted to an exemplary vehicle frame and to an exemplary steering knuckle, aligned with the view of FIG. 4A, with a second phantom line showing the forward position of the lower ball joint and wheel hub opening of the steering knuckle.
Figure 5A:
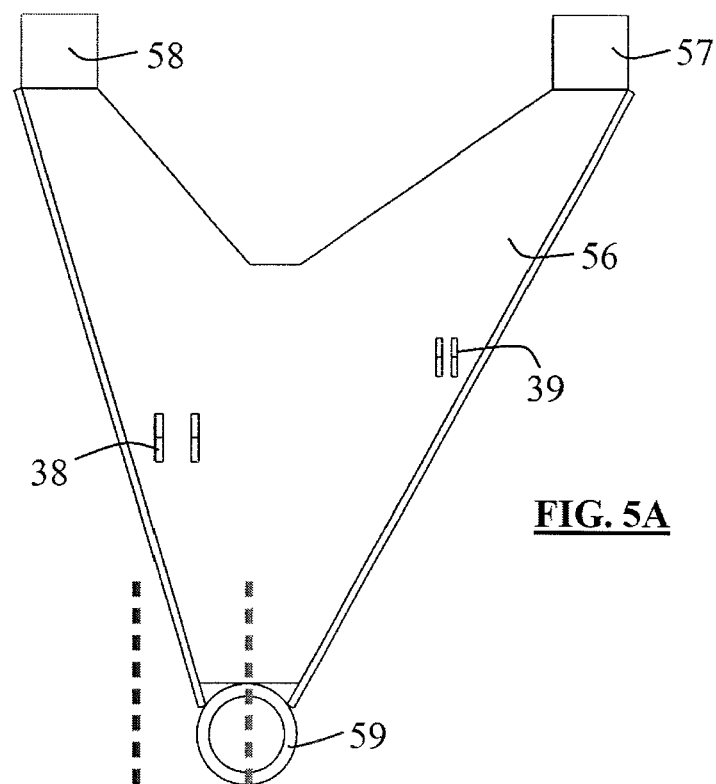
FIG. 5A is a side view of a lower factory control arm with a phantom line showing the position of the lower ball joint of the steering knuckle.
Figure 5B:
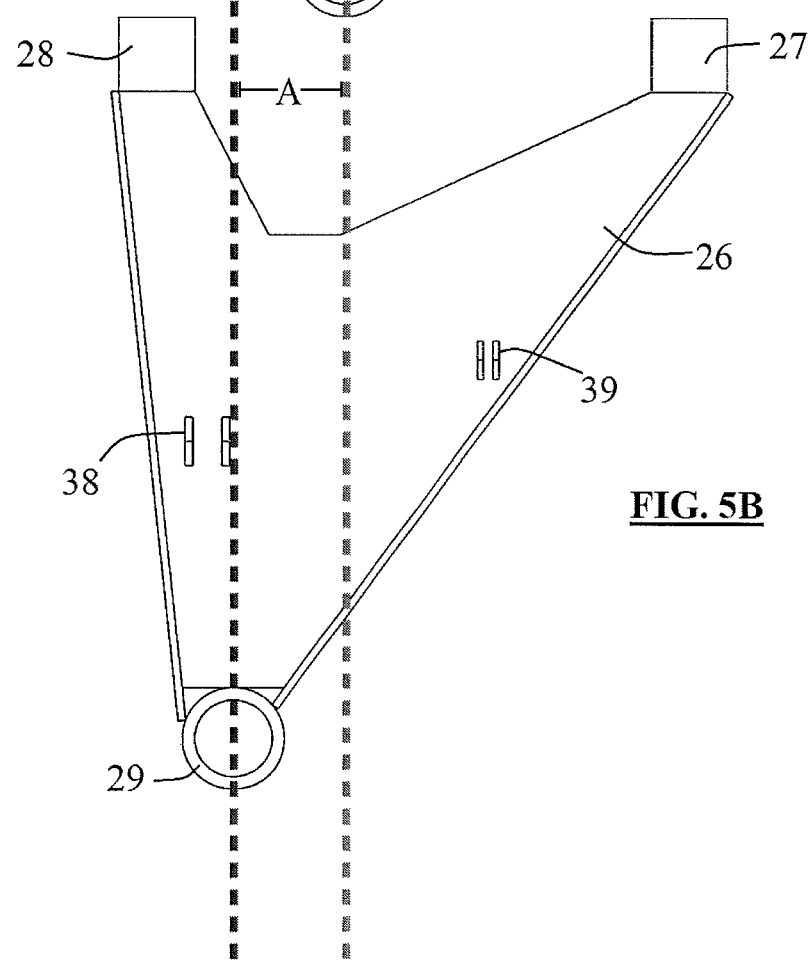
FIG. 5B is a side view of an embodiment of a lower control arm of an embodiment of the present invention with a second phantom line showing the forward position of the lower ball joint relative to the lower factory control arm of FIG. 5A.

The illustrated embodiments of the invention also include a lower control arm 26 having a pair of frame mounts 27 and 28 at one end, and a ball joint mount 29 at an opposite end. Mounts 27 and 28 are designed to attach to sub-frame assemblies 17 and 18, respectively, of frame 19. It is to be appreciated that the location of the lower ball joint mount 29 is forward of the position of the corresponding mount (e.g. lower ball joint mount) 59 of the lower factory control arm, as shown in FIGS. 4A and 4B (see gap "A"), such that the wheel hub opening 35 is also forward of its original position. Mount 29 may be a socket for receiving the ball portion of the stud of the lower ball joint of the steering knuckle.

Figure 6:
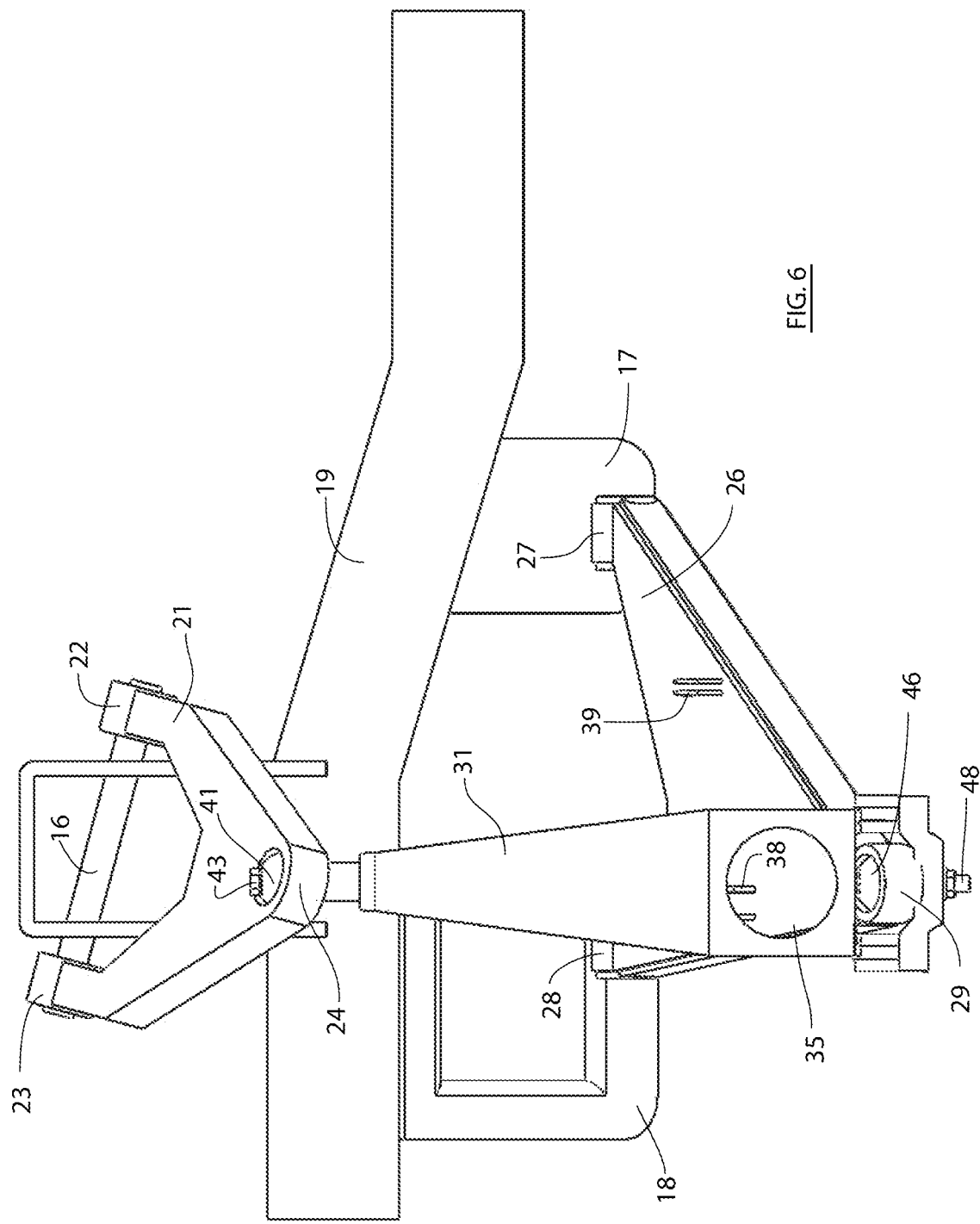
FIG. 6 is a side view of an alternative embodiment of the control arms of the present invention showing them mounted to an exemplary vehicle frame and to an exemplary steering knuckle.
Figure 7A:
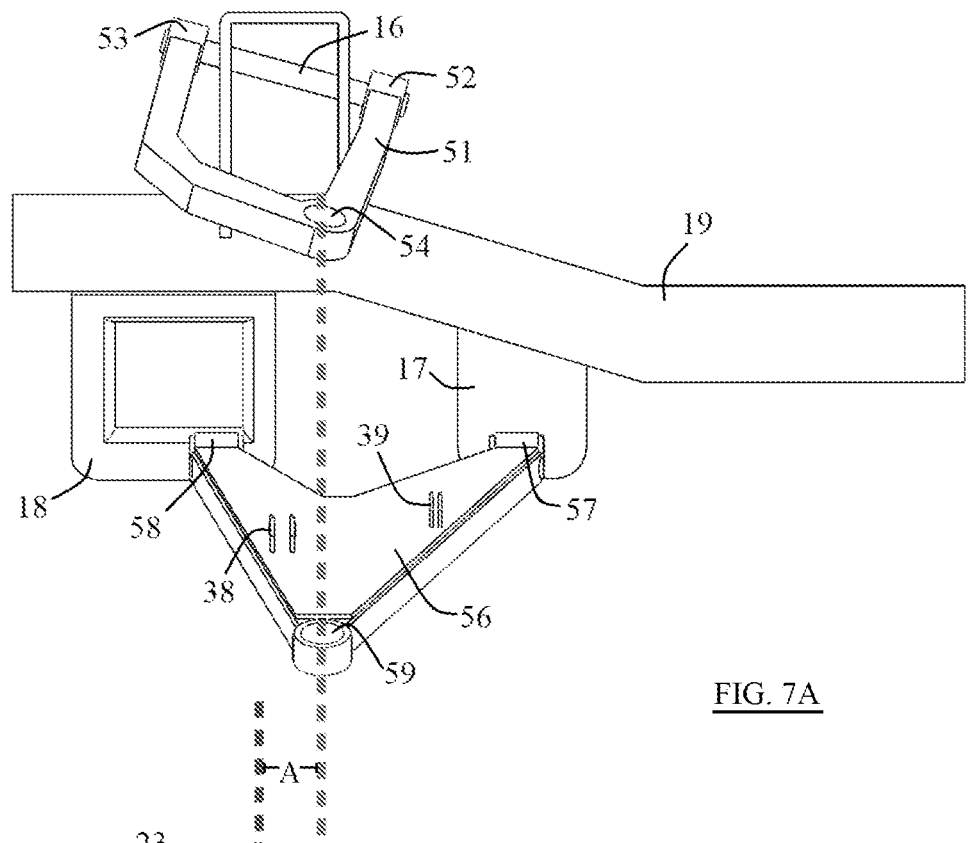
FIG. 7A is a side view of a set of upper and lower factory control arms showing them mounted to an exemplary vehicle frame, with a phantom line showing the position of the lower ball joint of the steering knuckle.
Figure 7B:
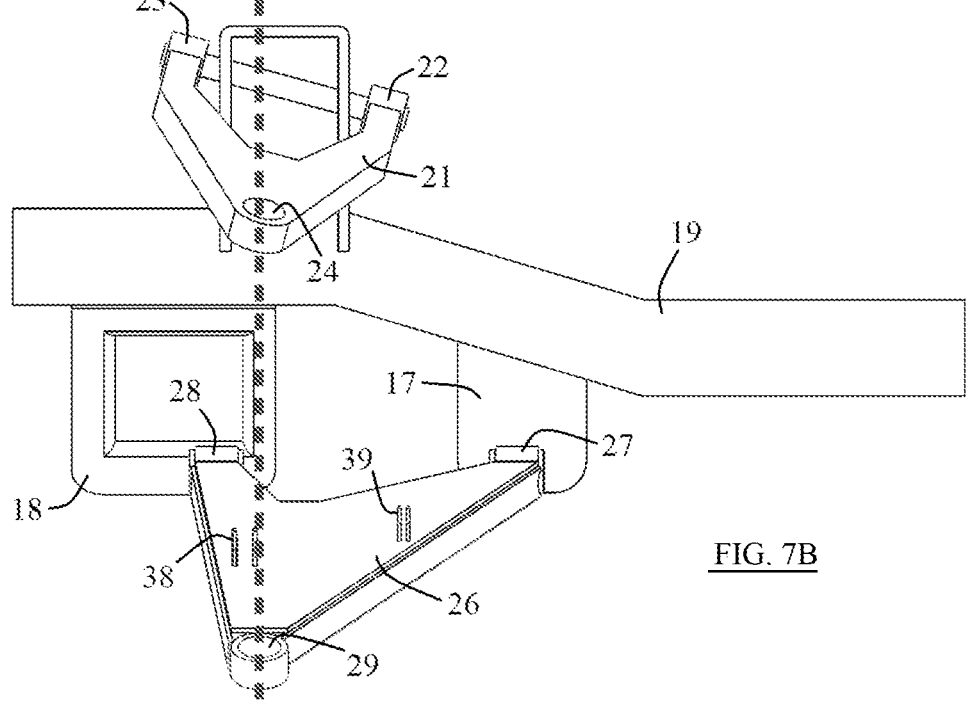
FIG. 7B is a side view of an alternative embodiment of upper and lower control arms of the present invention showing them mounted to an exemplary vehicle frame, aligned with the view of FIG. 7A, with a second phantom line showing the forward position of the lower ball joint of the steering knuckle.
Figure 8A:
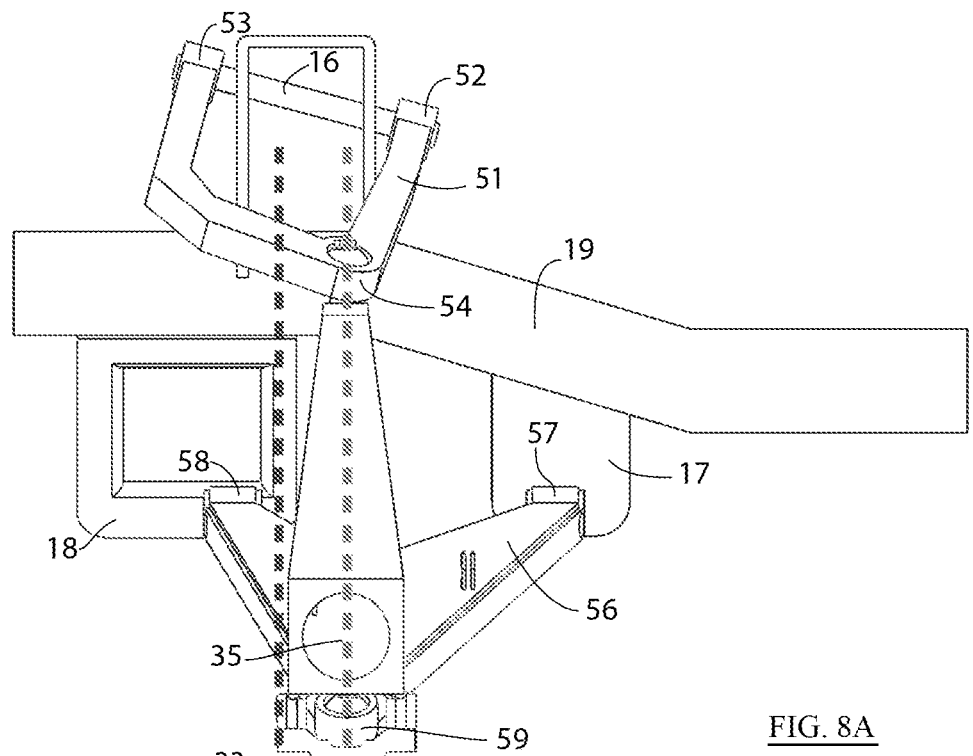
FIG. 8A is a side view of a set of upper and lower factory control arms showing them mounted to an exemplary vehicle frame and to an exemplary steering knuckle, with a phantom line showing the position of the lower ball joint and wheel hub opening of the steering knuckle.
Figure 8B:
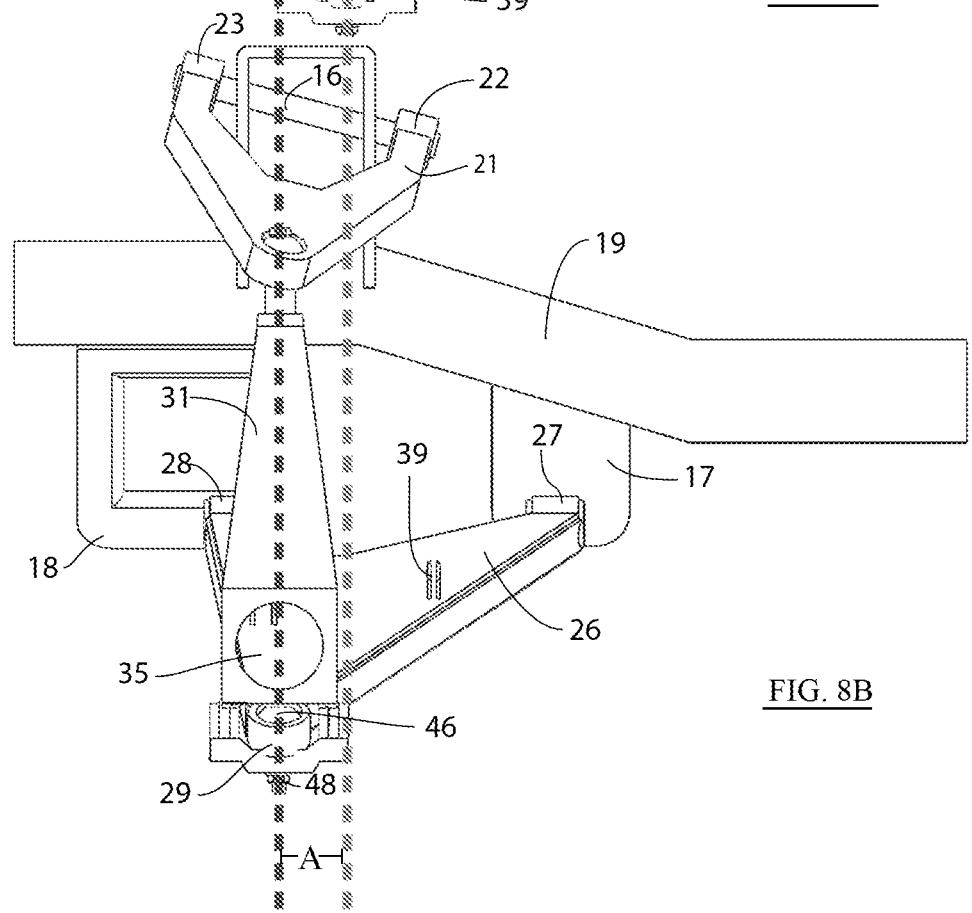
FIG. 8B is a side view of an alternative embodiment of the upper and lower control arms of the present invention showing them mounted to an exemplary vehicle frame and to an exemplary steering knuckle, aligned with the view of FIG. 8A, with a second phantom line showing the forward position of the lower ball joint and wheel hub opening of the steering knuckle.
Figures 9A, 9B:
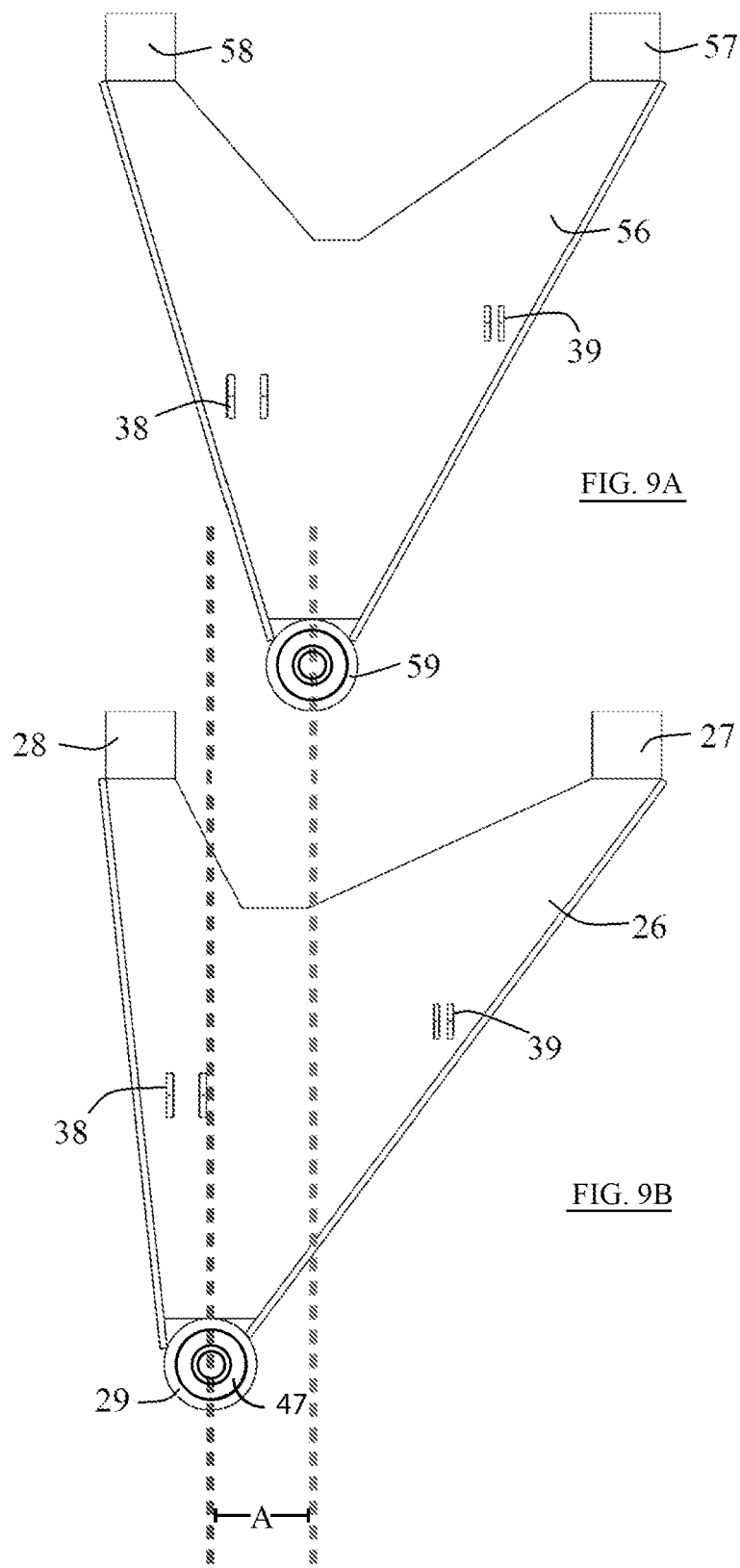
FIG. 9A is a side view of a lower factory control arm with a phantom line showing the position of the lower ball joint of the steering knuckle.
FIG. 9B is a side view of an alternative embodiment of a lower control arm of the present invention with a second phantom line showing the forward position of the lower ball joint relative to the lower factory control arm of FIG. 9A.

In the embodiments shown in FIGS. 6 and 8A-8B, mount 29 is in the form of a uni-ball 46 mounted inside a bearing 47 where the uni-ball 46 has an opening therethrough 49 (See FIG. 9B). A bolt 48 is passed through the uni-ball opening 49 such that the combination of the uni-ball and bolt (46, 48) replaces the stud of the lower ball joint of the steering knuckle. It is to be appreciated that the location of the lower mount 29 is forward of the position of the corresponding mount (e.g. lower ball joint mount) 59 of the lower factory control arm, as shown in FIGS. 8A and 8B (see gap "A"). In the embodiments shown in FIGS. 10-17 it is seen that lower mount 29 may be provided in the form of a horizontal ball joint mount, which is described more fully with reference to these figures below.

As noted elsewhere herein, the forward position of the pivotal mount 29 may be as little as about one inch (1") and as much as about four inches (4") or more, but preferably between one and one-half inches (1.5") and three inches (3"), and optimally around two and one half inches (2.5") in order to accommodate the most desirable wheel sizes. The length of lower control arm 26 may also be greater than that of the factory control arm 56 by a range of about one-half inch (½") to about four inches (4").

The embodiment of FIGS. 4A-4B illustrates the position of a steering knuckle 31 with wheel hub opening 35 mounted to factory upper and lower control arms (FIG. 4A), and the forward position of the steering knuckle 31 when mounted to the illustrated embodiments of the upper and lower control arms of the present invention (FIG. 4B). In these embodiments, it is seen that the upper ball joint mount 32 of the steering knuckle engages with upper ball joint mount 24 of upper control arm 21, and lower ball joint mount 33 of the steering knuckle engages with lower ball joint mount 29 of lower control arm 26. It is to be appreciated that in alternative embodiments, the stud of the upper ball joint mount of the factory steering knuckle may be removed and replaced with a uni-ball and bolt combination located at the end of the upper control arm; and that the stud of the lower ball joint mount of the factory steering knuckle may be removed and replaced with a uni-ball and bolt combination located at the end of the lower control arm, as shown in FIGS. 8A-8B. In other embodiments, the upper and lower mounts may be provided in the form of horizontal ball joints, as shown in FIGS. 10-17. A first shock absorber mount 38, and an optional second shock absorber mount 39 may also be provided on lower control arm 26.

FIGS. 8A-8B illustrate the position of a steering knuckle 31 with wheel hub opening 35 mounted to factory upper and lower control arms (FIG. 8A), and the forward position of the steering knuckle 31 when mounted to the illustrated embodiments of the upper and lower control arms of the present invention (FIG. 8B). In these embodiments, it is seen that the stud of the upper ball joint of the steering knuckle has been removed and replaced with a uni-ball and bolt combination (41, 43) which is mounted in bearing 42, with the bolt 43 attached to the steering knuckle where the upper ball joint stud had been previously attached. In these embodiments, it is seen that the stud of the lower ball joint of the steering knuckle has also been removed and replaced with a uni-ball and bolt combination (46, 48) which is mounted in bearing 47, with the bolt 48 attached to the steering knuckle where the lower ball joint stud had been previously attached. A first shock absorber mount 38, and an optional second shock absorber mount 39 may also be provided on lower control arm 26.

The after-market upper and lower control arms of the embodiments of FIGS. 1-9 of the present invention are designed to replace the factory-supplied control arms, and allow much larger tires to be mounted on the factory steering knuckle without rubbing against or interfering with the wheel well, body mount 13 or fender 14. These embodiments provide greater wheel-travel, suspension articulation, stability, clearance, and a reduction in overall component angles.

It is to be appreciated that although no replacement of the of factory steering knuckle is needed in many embodiments of the present invention, a custom steering knuckle can be used and attached to alternative embodiments of the control arms of the present invention. For example and without limitation, the control arms of such alternative embodiments may have any suitable joints for connection between such a custom steering knuckle and each control arm, including without limitation a uni-ball, spherical bearing and/or double shear joint.

In particular, as shown in FIGS. 10-14, it is seen that this illustrated embodiment of the invention includes an upper control arm 61 having a pair of frame mounts 62 and 63 at one end, and a horizontal ball joint mount 64 at an opposite end. Frame mounts 62 and 63 are designed to attach to sub-frame assembly 16 of frame 19. It is to be appreciated that the location of the upper horizontal ball joint mount 64 may be forward of the position of the corresponding mount (e.g. upper ball joint mount) 54 of the factory upper control arm, or it may be at approximately the same place, as shown in FIGS. 11A and 11B. Horizontal ball joint mount 64 may be in the form of a ball with dual shear for engagement with a socket 72 of an upper ball joint mount of the steering knuckle 71.

As noted elsewhere herein, the forward position of mount 64 may be zero (as shown in FIGS. 11A and 11B) in which case the lower ball joint mount 69 described below will have a forward location, and the steering knuckle itself (71) is angled toward the lower mount. In other embodiments, the forward position of mount 64 may be as little as about one inch (1") and as much as about four inches (4") or more, but preferably between one inch (1") and two and one-half inches (2.5"), and optimally around two and one half inches (2.5") in order to accommodate the most desirable wheel sizes. The length of upper control arm 61 may also be greater than that of the factory control arm 51 by a range of about one-half inch (½") to about four inches (4").

The embodiments of the invention illustrated in FIGS. 10-17 also include a lower control arm 66 having a pair of frame mounts 67 and 68 at one end, and lower horizontal ball joint mount 69 at an opposite end. Frame mounts 67 and 68 are designed to attach to sub-frame assemblies 17 and 18, respectively, of frame 19. It is to be appreciated that the location of the lower horizontal ball joint mount 69 is forward of the position of the corresponding mount (e.g. lower ball joint mount) 59 of the lower factory control arm, as shown in FIGS. 12A, 12B and 13A, 13B (see gap "B"), such that the wheel hub opening 75 is also forward of its original position. Horizontal mount 69 may be in the form of a horizontal ball joint with dual shear, for engagement with a socket 73 of a lower ball joint mount of the steering knuckle 71.

As noted elsewhere herein, the forward position of mount 69 may be as little as about one inch (1") and as much as about four inches (4") or more, but preferably between one inch (1") and two and one-half inches (2.5"), and optimally around two and one half inches (2.5") in order to accommodate the most desirable tire sizes. The length of lower control arm 66 may also be greater than that of the factory control arm 56 by a range of about one-half inch (½") to about four inches (4").

Figure 13A:
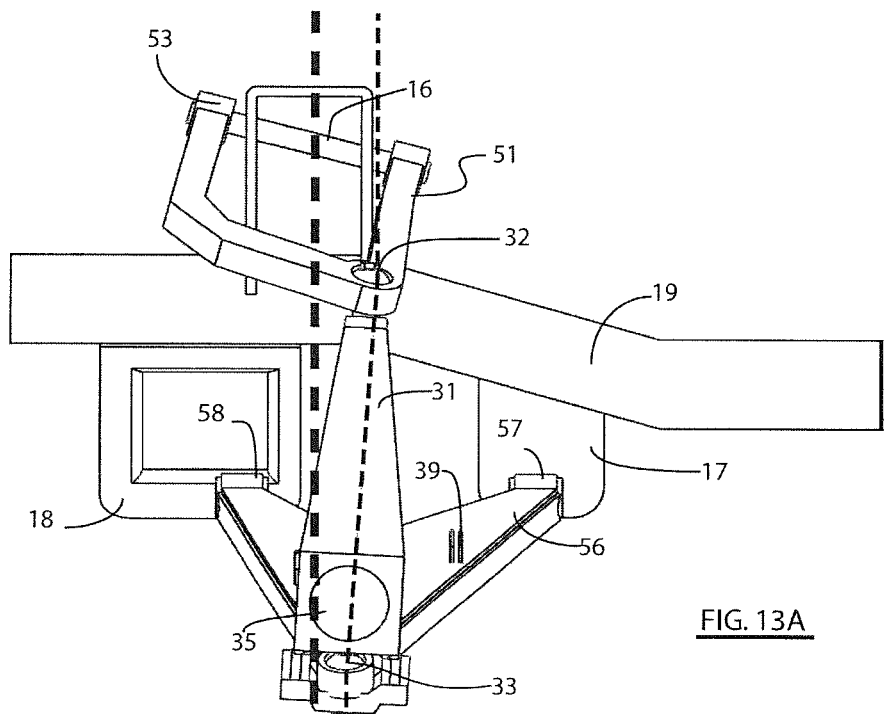
FIG. 13A is a side view of a set of upper and lower factory control arms and a factory steering knuckle showing them mounted to an exemplary vehicle frame, with a phantom line showing the position of the lower ball joint and wheel hub opening of the steering knuckle.
Figure 13B:
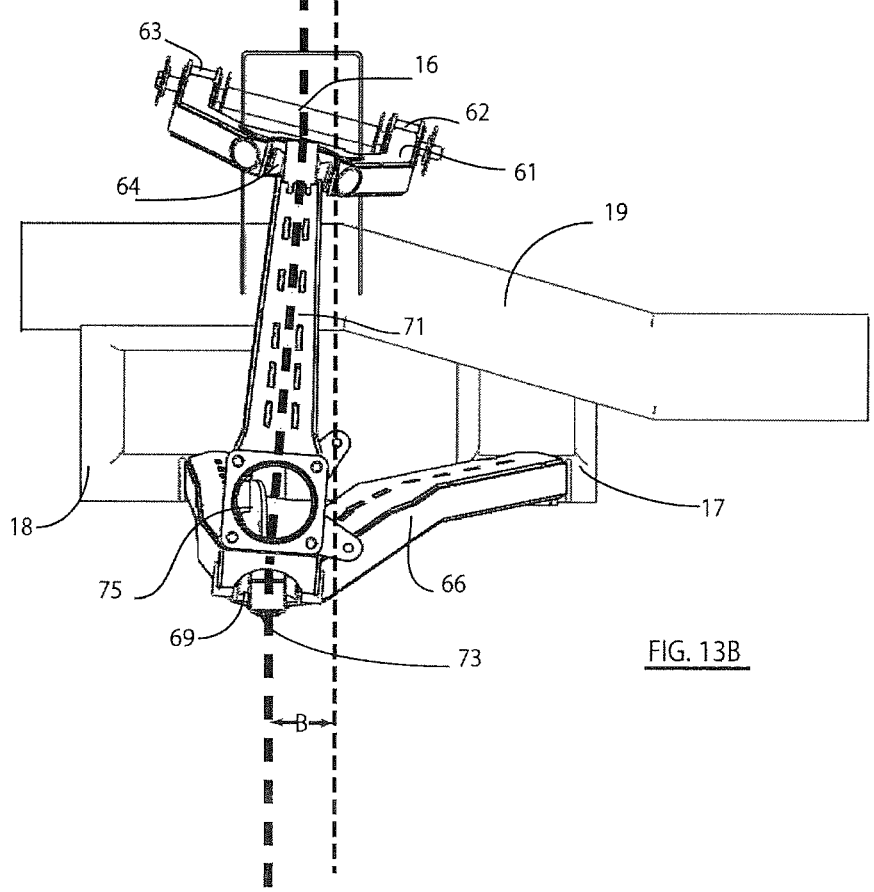
FIG. 13B is a side view of an embodiment of upper and lower control arms and a steering knuckle of the present invention showing them mounted to an exemplary vehicle frame, aligned with the view of FIG. 13A, with a second phantom line showing the forward position of the lower ball joint and wheel hub opening of the steering knuckle.
Figures 14A, 14B:
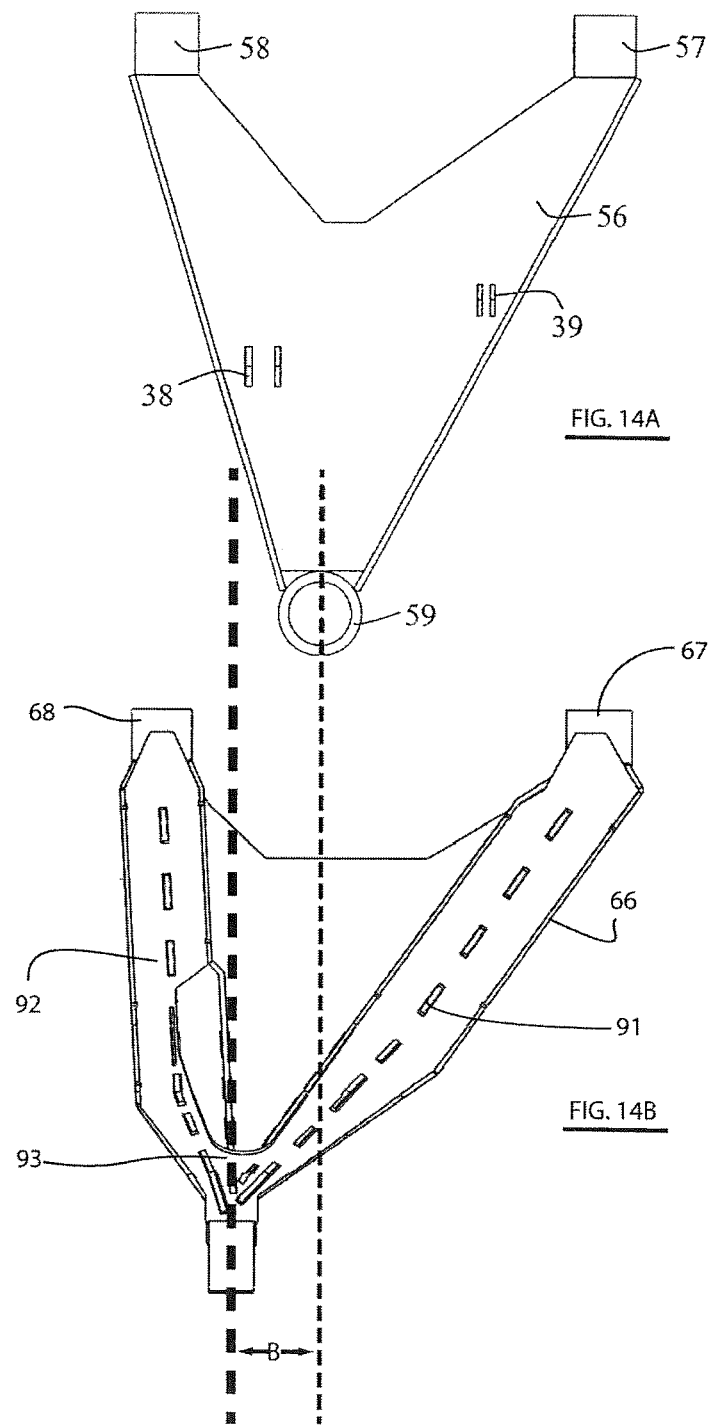
FIG. 14A is a side view of a lower factory control arm with a phantom line showing the position of the lower ball joint and wheel hub opening of the steering knuckle.
FIG. 14B is a side view of an embodiment of a lower control arm of an embodiment of the present invention with a second phantom line showing the forward position of the lower ball joint relative to the lower factory control arm of FIG. 14A.
Figure 15:
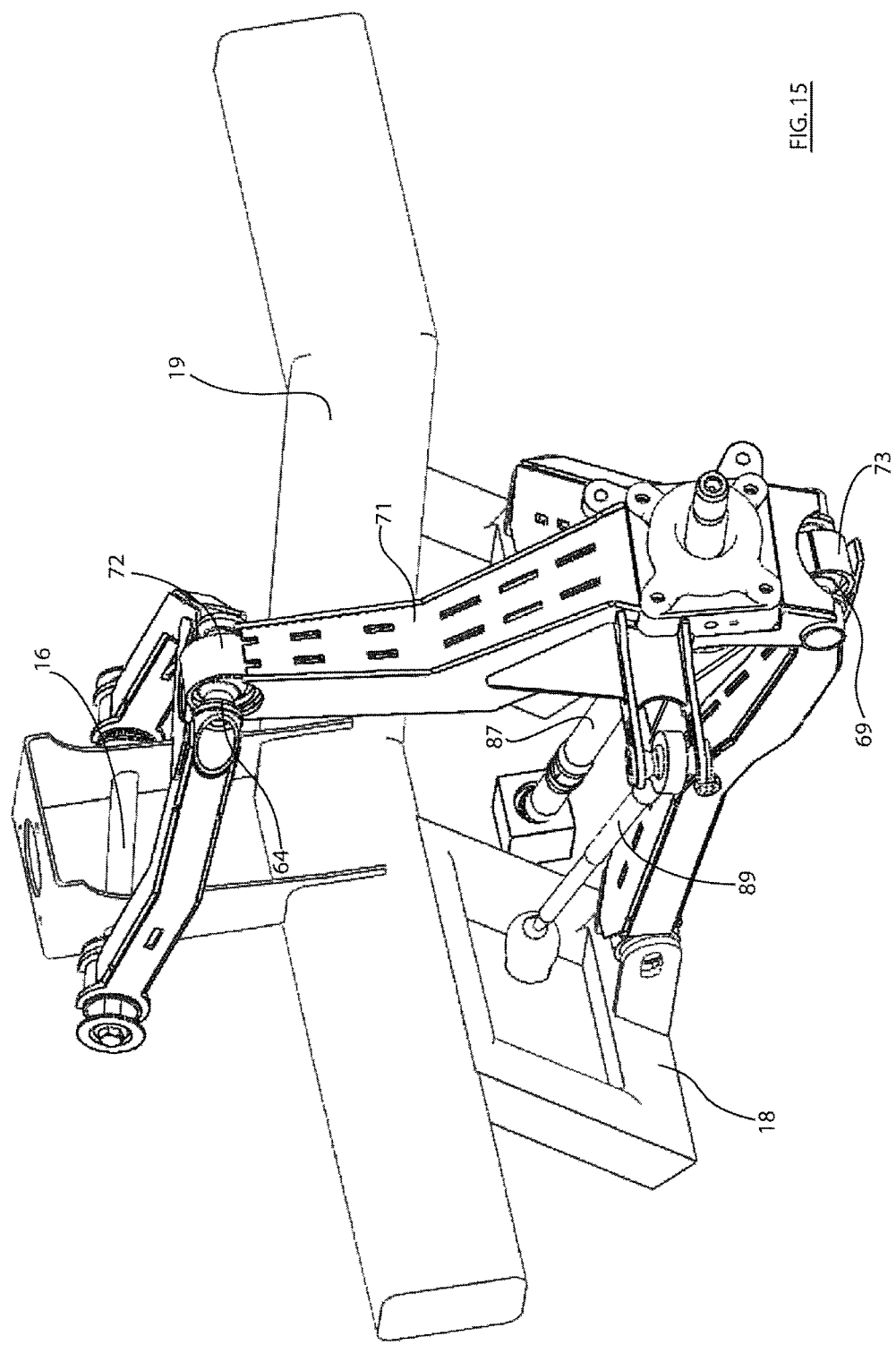
FIG. 15 is a left side perspective view of an embodiment of the present invention showing embodiments of an upper control arm, a lower control arm and a steering knuckle installed on a vehicle.
Figure 16:
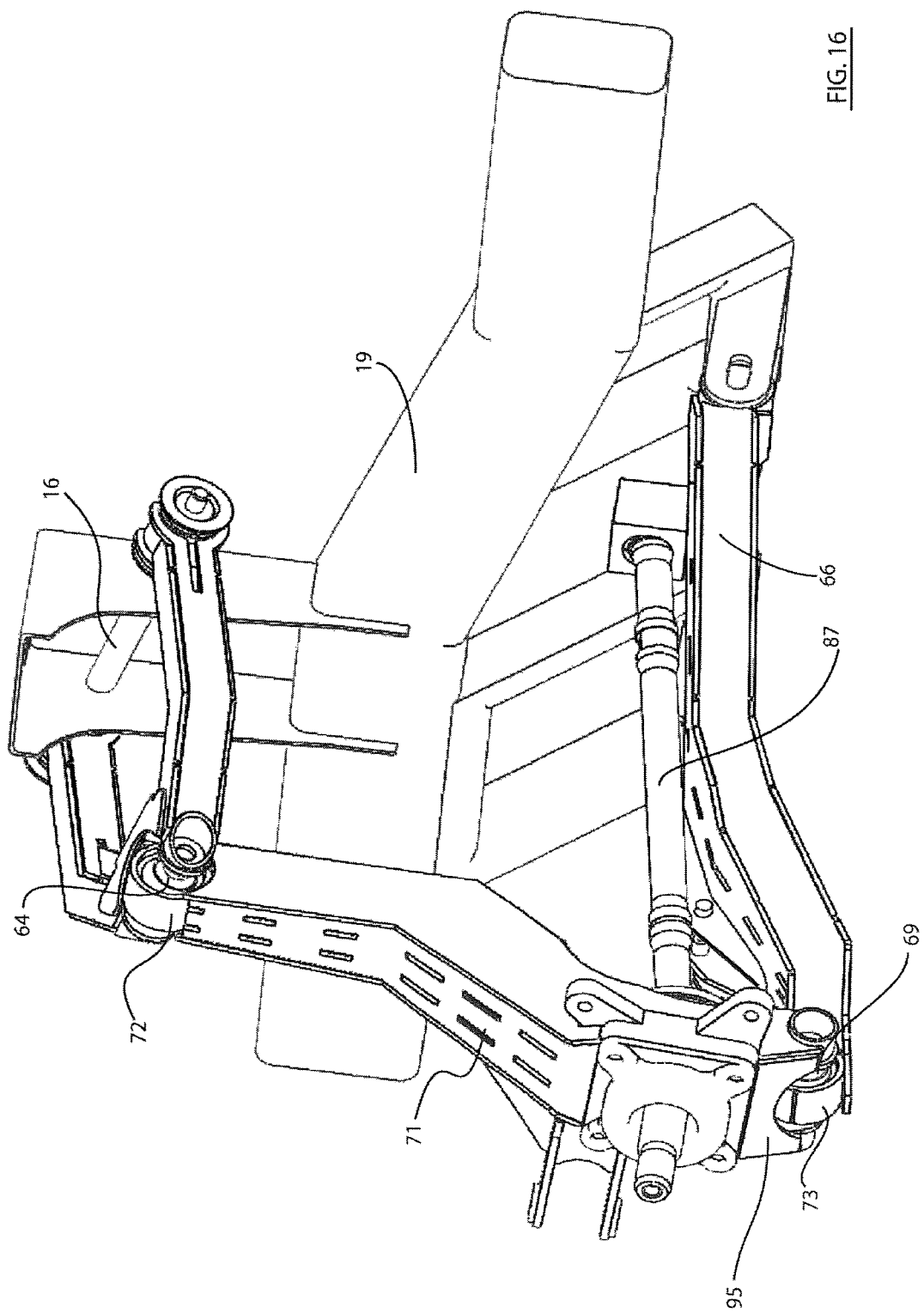
FIG. 16 is right side perspective view of an embodiment of the present invention showing embodiments of an upper control arm, a lower control arm and a steering knuckle installed on a vehicle.

The embodiment of FIGS. 13A-13B illustrates the position of a factory steering knuckle 31 with wheel hub opening 35 mounted to factory upper and lower control arms (FIG. 13A), and the forward position of the modified steering knuckle 71 and hub opening 75 when mounted to the illustrated embodiments of the upper and lower control arms of the present invention (FIG. 13B). In these embodiments, it is seen that the upper ball joint mount 72 of the steering knuckle 71 engages with horizontal upper ball joint mount 64 of upper control arm 61, and lower ball joint mount 73 of the steering knuckle 71 engages with lower horizontal ball joint mount 69 of lower control arm 66. A first shock absorber mount 78, and an optional second shock absorber mount 79 may also be provided on lower control arm 66.

Installation of upper and lower control arms of the present invention is accomplished by first removing the wheel, hub and steering knuckle 31 from the vehicle. Then the factory supplied upper and lower control arms are removed. In some embodiments, the axle 86 must also be removed and replaced with a longer axle 87. In some embodiments, the steering control arm 88 must also be removed and replaced with a different steering control arm 89. Then, an upper control arm of the present invention is engaged with the same sub-frame mounts as the upper factory control arm, and a lower control arm of the present invention is engaged with the same sub-frame mounts as the lower factory control arm. To the extent that the wheel hub center is moved forward in any significant amount (e.g. greater than 1-inch), the vehicle steering assembly may need to be repositioned or otherwise modified in order to prevent steering interference.

In some embodiments, the forwardly positioned upper ball joint mount 24 is engaged with the upper ball joint mount 32 of the steering knuckle 31, and the forwardly positioned lower ball joint mount 29 is engaged with the lower ball joint mount 33 of the steering knuckle. The wheel hub is then attached to the steering knuckle resulting in the wheel hub being located forward from the original wheel position with the factory control arms. A larger wheel and tire may then be placed on the hub.

In other embodiments, a uni-ball 41 and bearing 42 may be provided at a forwardly-moved end of the upper control arm 21, and a uni-ball 46 and bearing 48 may be provided at a forwardly-moved end of the lower control arm 26. The stud of the upper ball joint of the steering knuckle is removed, a bolt 43 is passed through an opening 44 in the upper uni-ball 41, and the bolt 43 is attached to the steering knuckle where the upper stud had previously been attached. Similarly, the stud of the lower ball joint of the steering knuckle is removed, a bolt 48 is passed through an opening 49 in the lower uni-ball 46, and the bolt 48 is attached to the steering knuckle where the lower stud had previously been attached.

In further embodiments, the factory supplied upper and lower control arms, and the factory supplied steering knuckle are all removed. Then, an upper control arm of the present invention is engaged with the same sub-frame mounts as the upper factory control arm, and a lower control arm of the present invention is engaged with the same sub-frame mounts as the lower factory control arm. In these embodiments, the factory axle is removed and replaced with a longer axle 87. In these embodiments, the steering control arm 88 must also be removed and replaced with a different steering control arm 89. The (forwardly positioned) upper ball joint mount 64 is engaged with an upper ball joint mount 72 of the steering knuckle 71, and the forwardly positioned lower ball joint mount 69 is engaged with the lower ball joint mount 73 of the steering knuckle 71. To the extent that the wheel hub center is moved forward any significant amount (e.g., greater than 1-inch), the vehicle steering assembly may need to be repositioned or otherwise modified in order to prevent steering interference. The wheel hub is then attached to the steering knuckle resulting in the wheel hub being located forward from the original wheel position with the factory control arms. A larger wheel and tire may then be placed on the hub.

Figure 17:
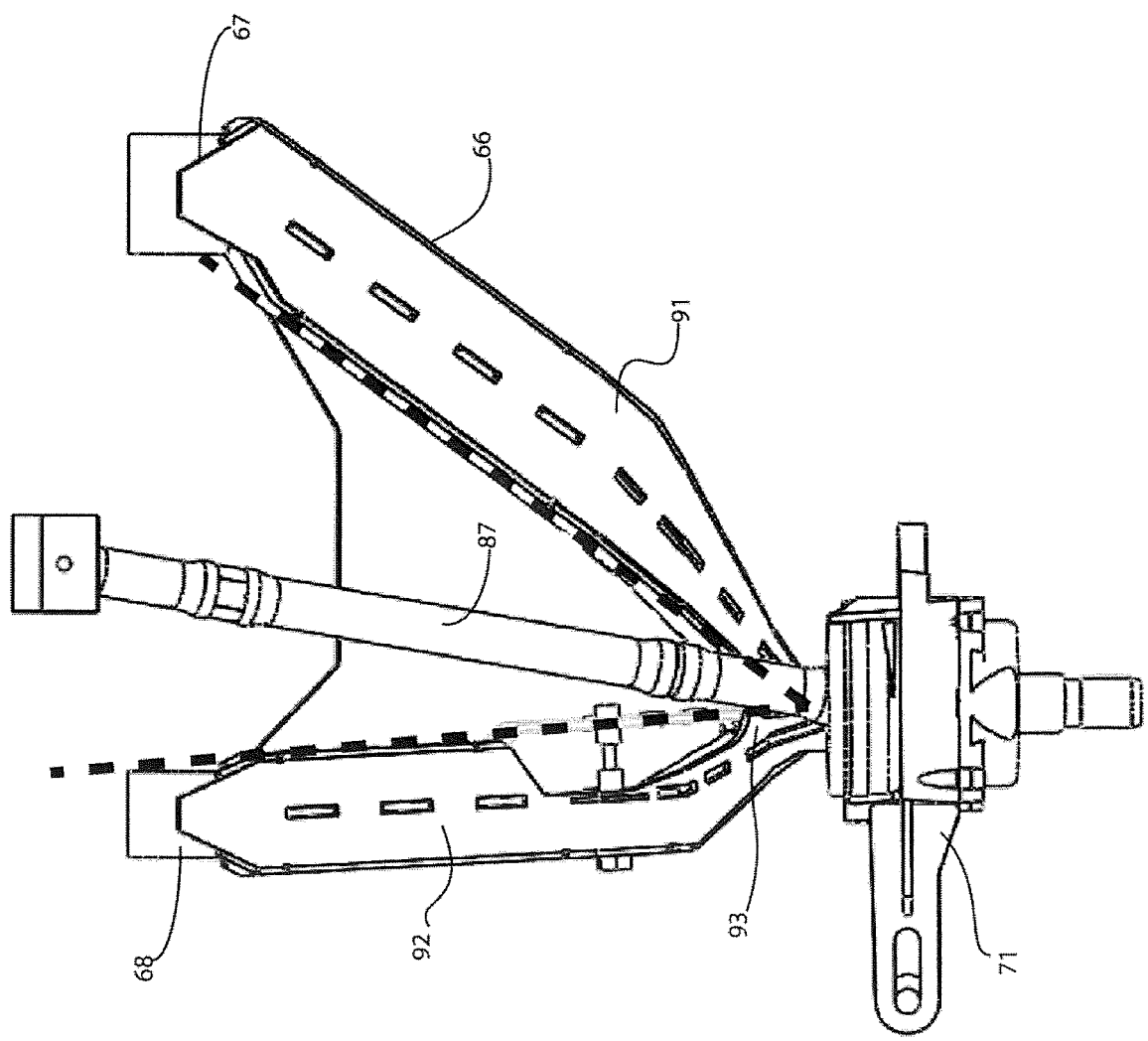
FIG. 17 is a close up view of an embodiment of a lower control arm of the present invention.

FIG. 17 shows detail of an embodiment of a lower control arm of the present invention. In these embodiments, the lower control arm 66 is formed in the general shape of the letter "V" having two arms 91 and 92 that are joined at junction 93. The distal ends of these arms 67 and 68 engage the frame supports 17 and 18, respectively, of the vehicle, and the proximate ends are joined at junction 93 which is attached to the lower joint of a steering knuckle 71. The embodiment illustrated in FIG. 17 discloses a horizontal ball joint mount at junction 93 that engages with a horizontal ball joint mount 95 on the steering knuckle 71. However, it is to be appreciated that a vertical ball joint or other junction structure may also be used to connect the lower control arm to the steering knuckle.

Figure 18:
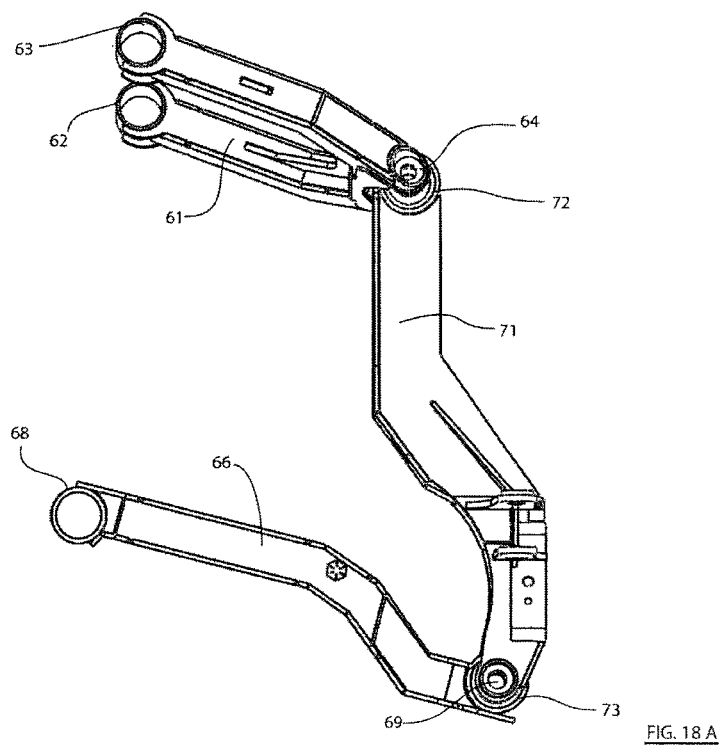
FIG. 18A is a front perspective view of an embodiment of the invention showing upper and lower control arms connected to an embodiment of a steering knuckle.
FIG. 18B is a front perspective view of an embodiment of the invention showing upper and lower control arms connected to the vehicle and to an embodiment of a steering knuckle.
Figure 18:
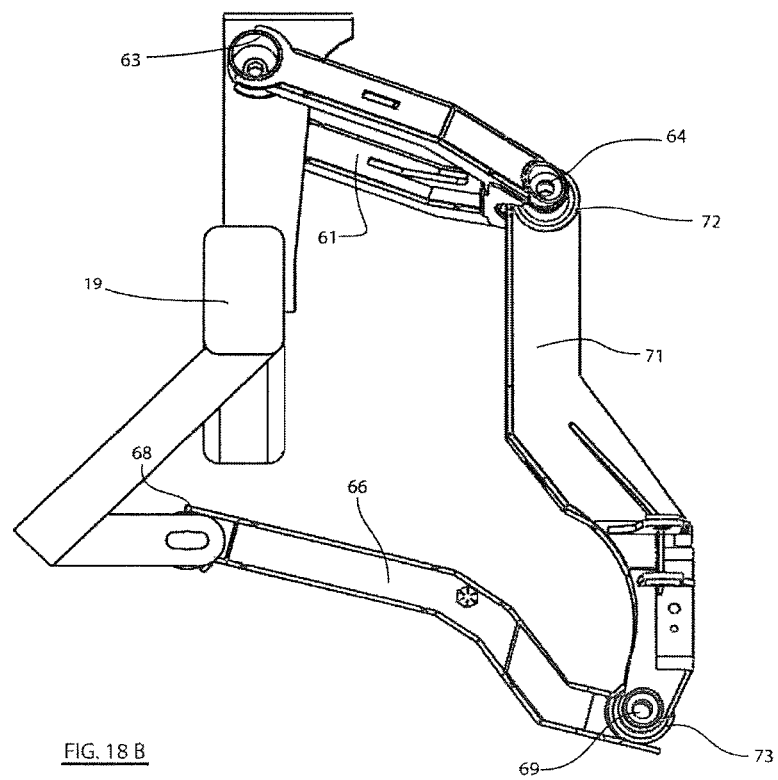
Figure 19:
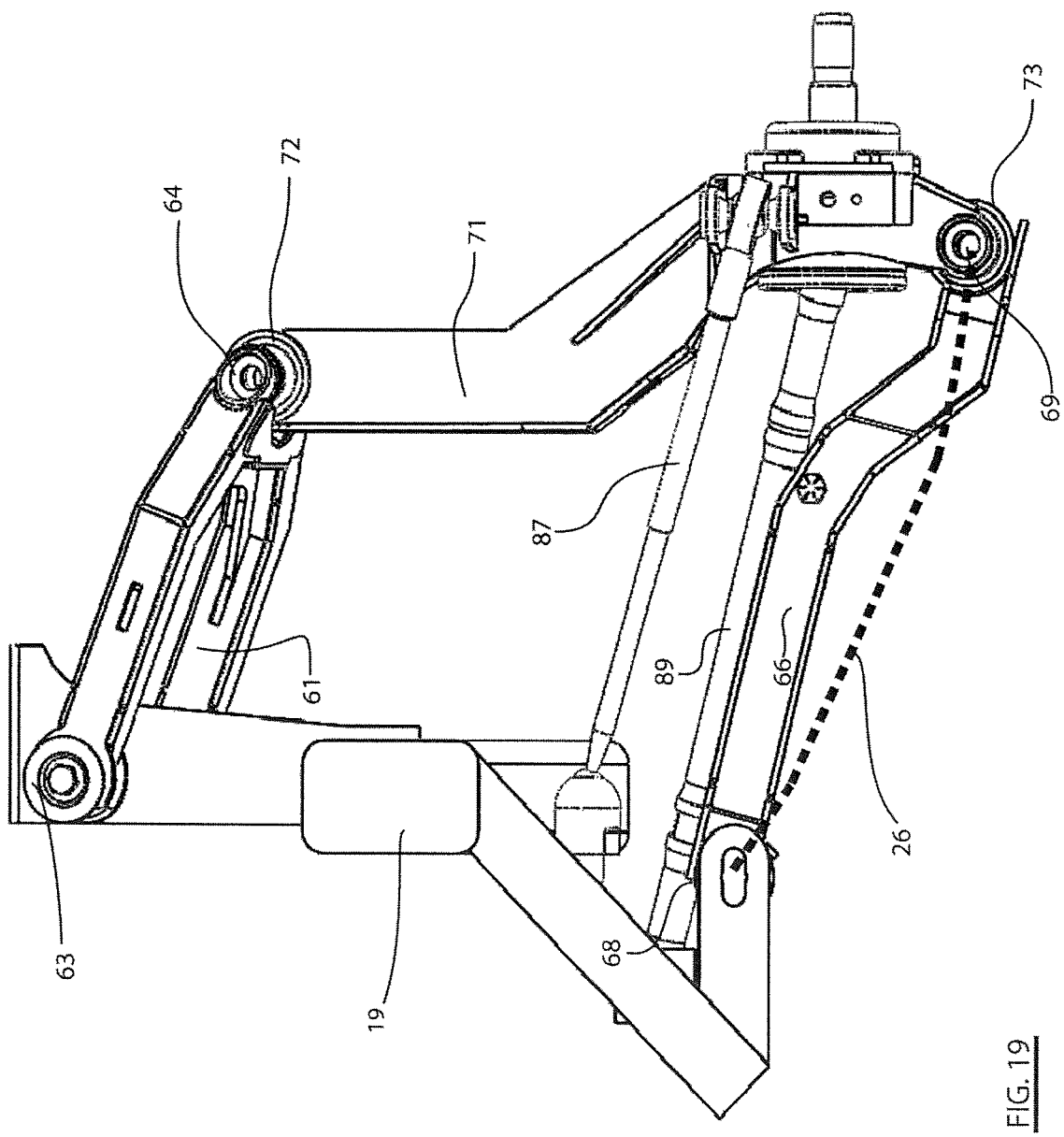
FIG. 19 is a front perspective view of an embodiment of the invention showing upper and lower control arms connected to the vehicle and to an embodiment of a steering knuckle, also disclosing the positions of the steering control arm and wheel axle.

FIGS. 18-20 show front views of an embodiment of the invention having an upper control arm 61, lower control arm 66, and steering knuckle 71. The front view of FIG. 20, shows the position of a lower factory control arm 26 in phantom lines. It is seen that in these embodiments, the lower control arm provides more clearance between the ground and the bottom of the vehicle, more forward caster, an improved camber angle, more room for the wheel axle, and a wider wheel base which provides more overall stability. Embodiments of the lower control arms may include lower plating which helps protect and prevent damage to the brake lines and wheel axle.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An apparatus for mounting a steering knuckle on a vehicle such that a hub opening of the steering knuckle is at a position that is closer to a front of the vehicle than a factory position for said hub opening comprising:
   a. an upper steering knuckle control arm comprising a first body having a first pair of mounts at one end thereof for engagement with a vehicle frame, and a first ball joint mount at an opposite end thereof for engagement with a first ball joint of said steering knuckle, and
   b. a lower steering knuckle control arm comprising a second body having a second pair of mounts at one end thereof for engagement with the vehicle frame, and a second ball joint mount at an opposite end thereof for engagement with a second ball joint of said steering knuckle,
wherein the first and second ball joint mounts are located closer to the front of the vehicle than corresponding positions of stock first and second ball joint mounts of stock upper and lower steering knuckle control arms replaced by said apparatus.

2. The apparatus of claim 1 wherein said first ball joint is a horizontal ball joint.

3. The apparatus of claim 1 wherein said first ball joint is a uni-ball.

4. The apparatus of claim 1 wherein said second ball joint is a horizontal ball joint.

5. The apparatus of claim 1 wherein said second ball joint is a uni-ball.

6. The apparatus of claim 1 wherein said first and second ball joints are horizontal ball joints.

7. The apparatus of claim 1 wherein said first and second ball joints are uni-balls.

8. The apparatus of claim 1 wherein said upper control arm is longer than the replaced stock upper control arm.

9. The apparatus of claim 1 wherein said lower control arm is longer than the replaced stock lower control arm.

10. The apparatus of claim 1 wherein both said upper control arm and said lower control arm are longer than the corresponding replaced stock upper and lower control arms.

11. The apparatus of claim 1 wherein the first and second ball joint mounts are closer to the front of the vehicle by an approximately equal distance.

12. The apparatus of claim 1 wherein the position of said first ball joint mount of said upper control arm is closer to the front of the vehicle by an amount of between about one inch (1") and about four inches (4"), and the position of said second ball joint mount of said lower control arm is closer to the front of the vehicle by an amount of between about one inch (1") and about four inches (4").

13. The apparatus of claim 1 wherein the position of said first ball joint mount of said upper control arm is closer to the front of the vehicle by an amount of between about one inch (1") and about two and one half inches (2.5"), and the position of said second ball joint mount of said lower control arm is closer to the front of the vehicle by an amount of between about one inch (1") and about two and one half inches (2.5").

14. The apparatus of claim 1 wherein the position of said first ball joint mount of said upper control arm is closer to the front of the vehicle by an amount of about one inch (1"), and the position of said second ball joint mount of said lower control arm is closer to the front of the vehicle by an amount of about one inch (1").

15. The apparatus of claim 1 wherein the position of said first ball joint mount of said upper control arm is closer to the front of the vehicle by an amount of about two inches (2"), and the position of said second ball joint mount of said lower control arm is closer to the front of the vehicle by an amount of about two inches (2").

16. The apparatus of claim 1 wherein the position of said first ball joint mount of said upper control arm is closer to the front of the vehicle by an amount of about two and one half inches (2.5"), and the position of said second ball joint mount of said lower control arm is closer to the front of the vehicle by an amount of about two and one half inches (2.5").

17. The apparatus of claim 1 wherein the position of said first ball joint mount of said upper control arm is closer to the front of the vehicle by an amount of at least one inch (1"), and the position of said second ball joint mount of said lower control arm is closer to the front of the vehicle by an amount of at least one inch (1").

18. The apparatus of claim 1 wherein the position of said first ball joint mount of said upper control arm is closer to the front of the vehicle by an amount of at least two inches (2"), and the position of said second ball joint mount of said lower control arm is closer to the front of the vehicle by an amount of at least two inches (2").

19. The apparatus of claim 1 wherein the position of said first ball joint mount of said upper control arm is closer to the front of the vehicle by an amount of at least two and one half inches (2.5"), and the position of said second ball joint mount of said lower control arm is closer to the front of the vehicle by an amount at least two and one-half inches (2.5").

20. A method for moving a steering knuckle of a vehicle forward such that a hub opening of the steering knuckle is at a position that is closer to a front of the vehicle than a factory position for said hub comprising the steps of:
  a. removing a wheel, hub and steering knuckle from the vehicle;
  b. removing upper and lower steering knuckle control arms from the vehicle;
  c. installing an upper steering knuckle control arm on said vehicle, said upper control arm having a body with a first pair of mounts at one end thereof for engagement with a vehicle frame, and a first ball joint mount at an opposite end thereof, the first ball joint mount being located at a position that is closer to the front of the vehicle than a corresponding position of a first ball joint mount of the upper steering knuckle control arm that was removed from the vehicle;
  d. installing a lower steering knuckle control arm on said vehicle, said lower control arm having a body with a second pair of mounts at one end thereof for engagement with the vehicle frame, and a second ball joint mount at an opposite end thereof, the second ball joint mount being located at a position that is closer to the front of the vehicle than a corresponding position of a second ball joint mount of the lower steering knuckle control arm that was removed from the vehicle;
  e. attaching the steering knuckle to the installed upper and lower control arms; and
  f. attaching the hub, wheel and tire.

21. The method of claim 20 wherein the step of attaching the steering knuckle comprises the steps of engaging a first ball joint with the first ball joint mount on said upper control arm and with an upper ball joint mount on the steering knuckle, and engaging a second ball joint with the second ball joint mount on said lower control arm and with a lower ball joint mount on the steering knuckle.

22. The method of claim 20 wherein the step of attaching the steering knuckle comprises the steps of removing studs of the upper and lower ball joints of the steering knuckle, passing a first bolt through an opening in an upper uni-ball on said upper control arm, attaching the first bolt to the steering knuckle where an upper stud had previously been attached, passing a second bolt through an opening in a lower uni-ball on said lower control arm, and attaching the second bolt to the steering knuckle where a lower stud had previously been attached.

23. The method of claim 20 comprising the additional step of removing a wheel axle from the vehicle and replacing said axle with a longer wheel axle.

24. The method of claim 20 comprising the additional step of removing a steering control arm from the vehicle and replacing said steering control arm with a longer steering control arm.

25. The method of claim 20 comprising the additional step of removing a shock absorber from the vehicle and replacing said shock absorber with a longer shock absorber.

26. The apparatus of claim 1 wherein the steering knuckle further comprises a hub opening, such that when the steering knuckle is mounted to the vehicle using said upper and lower control arms, the hub opening is positioned closer to the front of the vehicle than when mounted using said replaced stock upper and lower control arms.

27. An apparatus for mounting a steering knuckle on a vehicle comprising:
  a. a steering knuckle;
  b. an upper steering knuckle control arm comprising a first body having a first pair of mounts at one end thereof for engagement with a vehicle frame and a first ball joint mount at an opposite end thereof for engagement with a first upper ball joint of said steering knuckle, and
  c. a lower steering knuckle control arm comprising a second body having a second pair of mounts at one end thereof for engagement with the vehicle frame, and a second ball joint mount at an opposite end thereof for engagement with a lower ball joint of said steering knuckle,
wherein said first and second ball joint mounts are located at positions that are closer to a front of the vehicle than corresponding positions of stock upper and lower control arms replaced by said apparatus.

28. The apparatus of claim 27 wherein the steering knuckle further comprises a hub opening, such that when the steering knuckle is mounted to the vehicle using said upper and lower control arms, the hub opening is positioned closer to the front of the vehicle than when mounted using said replaced stock upper and lower control arms.

29. A method for replacing a steering knuckle of a vehicle such that a hub opening of the replacement steering knuckle is at a position that is closer to a front of the vehicle than a stock position for a hub of the replaced steering knuckle comprising the steps of:
  a. removing a wheel, hub and steering knuckle from the vehicle;
  b. removing upper and lower steering knuckle control arms from the vehicle;
  c. installing an upper steering knuckle control arm on said vehicle, said upper control arm having a body with a first pair of mounts at one end thereof for engagement with a vehicle frame, and a first ball joint mount at an opposite end thereof, the first ball joint mount being located at a position that is closer to the front of the vehicle than a corresponding position of a first ball joint mount of the upper steering knuckle control arm that was removed from the vehicle;
  d. installing a lower steering knuckle control arm on said vehicle, said lower control arm having a body with a second pair of mounts at one end thereof for engagement with the vehicle frame, and a second ball joint mount at an opposite end thereof, the second ball joint mount being located at a position that is closer to the front of the vehicle than a corresponding position of a second ball joint mount of the lower steering knuckle control arm that was removed from the vehicle;
  e. attaching a replacement steering knuckle to the installed upper and lower control arms; and
  f. attaching the hub, wheel and tire.

* * * * *